US012792632B1

(12) United States Patent
Ramakrishnan et al.

(10) Patent No.: US 12,792,632 B1
(45) Date of Patent: Nov. 10, 2026

(54) AI-DRIVEN LOGIC EXTRACTION, SEARCH, AND VALIDATION ACROSS AN APPLICATION CODEBASE

(71) Applicant: International Business Machines Corporation, Armonk, NY (US)

(72) Inventors: Renjith Ramakrishnan, Kollam (IN); Suman Patra, Raritan, NJ (US); Mayank Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/276,088

(22) Filed: Jul. 22, 2025

(51) Int. Cl.
*G06F 16/93* (2019.01)
*G06F 16/242* (2019.01)
*G06F 16/248* (2019.01)
*G06F 16/28* (2019.01)

(52) U.S. Cl.
CPC .......... *G06F 16/282* (2019.01); *G06F 16/243* (2019.01); *G06F 16/248* (2019.01)

(58) Field of Classification Search
None
See application file for complete search history.

(56) References Cited

U.S. PATENT DOCUMENTS 7,831,608 B2 * 11/2010 Aizenbud-Reshef ..... G06F 8/36 717/136
9,262,173 B2 * 2/2016 Akkary ................. G06F 9/3834
9,996,799 B2 6/2018 Bostick et al.
10,740,093 B2 * 8/2020 Lai ............................ G06F 8/71
11,221,832 B2 * 1/2022 Makkar ...................... G06F 8/33
11,327,456 B2 * 5/2022 Fox ........................... G06F 8/71
11,354,120 B1 6/2022 Zhang et al.
11,836,069 B2 * 12/2023 Balasubramanian ........................ G06F 11/3616
12,282,553 B1 * 4/2025 Long ..................... G06F 21/563
12,373,558 B1 * 7/2025 Long ..................... G06F 21/563
2005/0262056 A1 * 11/2005 Hamzy ..................... G06F 8/36
(Continued)

OTHER PUBLICATIONS

Brandtberg Ronnie. "Re-Engineering Strategies for Legacy Software Systems", Department of Computer Science, Jun. 6, 2020, 81 Pages.

(Continued)

*Primary Examiner* — Debbie M Le
(74) *Attorney, Agent, or Firm* — CHIP LAW GROUP

(57) ABSTRACT

Artificial Intelligence (AI)-driven logic extraction, search, and validation across an application codebase is provided. The method includes receiving file data associated with a source code repository of a computer-executable application. A plurality of code chunks is extracted from the file data. A hierarchical database is generated based on the plurality of code chunks. The hierarchical database comprises a plurality of nodes representing code chunks, and relationships between the plurality of nodes representing dependencies among the code chunks. The plurality of nodes in the hierarchical database are traversed. A set of prompts is generated based on the traversal. Each prompt comprises a respective code chunk. A natural language description corresponding to each node is generated based on applying the neural language model to the set of prompts. The natural language description corresponding to each node is stored in the hierarchical database.

20 Claims, 10 Drawing Sheets

(56) References Cited

U.S. PATENT DOCUMENTS

| | | | | |
|---|---|---|---|---|
| 2018/0067836 | A1 | 3/2018 | Apkon et al. | |
| 2026/0050533 | A1* | 2/2026 | Sahar .................... | G06F 11/302 |

OTHER PUBLICATIONS

Kamimura, “Measuring Business Logic Complexity in Software Systems”, 2015 Asia-Pacific Software Engineering Conference, Dec. 1-4, 2015, 7 Pages.
Khan, et al., “Automatic Code Documentation Generation Using GPT-3”, arXiv:2209.02235v1, Sep. 6, 2022, 6 Pages.
No Author, “IBM Watson to Watsonx”, IBM AI, Jul. 15, 2025, 10 Pages.
No Author, “Steps to Successfully Modernise Legacy Systems”, Workingmouse Blogs, Jun. 16, 2025, 12 Pages.
Sneed Harry. “Extracting Business Logic from Existing COBOL Programs as a Basis for Redevelopment”, Proceedings 9th International Workshop on Program Comprehension. IWPC 2001, May 12, 2001, 9 Pages.
Son Hannah. “Acceptance Criteria in Agile Testing”, Testrail, Dec. 22, 2023, 10 Pages.

* cited by examiner

AI-DRIVEN LOGIC EXTRACTION, SEARCH, AND VALIDATION ACROSS AN APPLICATION CODEBASE

BACKGROUND

The disclosure relates to software engineering, and more particularly, to processing information related to codebases.

Software systems, especially legacy applications, often lack comprehensive documentation of their underlying business logic and processes, which can pose challenges during maintenance, modernization, or migration efforts. This documentation deficit extends beyond simple code comments to encompass the intricate business logic, workflows, and processes embedded within the application, significantly impeding various software lifecycle activities. During routine maintenance, developers may struggle to understand the rationale behind certain implementations, leading to increased time spent on bug fixes and feature enhancements, while modernization efforts face even greater challenges as teams often find themselves reverse-engineering existing applications to discern core functionality and business rules. Migration projects, whether moving to new platforms, cloud environments, or different programming languages, are similarly affected without clear documentation of the system's behavior and requirements, leading to extended testing cycles, increased project costs, and potential disruptions to business operations. Furthermore, the lack of documentation hampers knowledge transfer within organizations as experienced developers retire or move on, making the task increasingly difficult for new team members to effectively maintain or enhance the software.

SUMMARY

In various embodiments of the disclosure, a computer-implemented method is described. The method includes receiving file data associated with a source code repository of a computer-executable application. The method further includes extracting a plurality of code chunks from the file data. The method also includes generating a hierarchical database based on the plurality of code chunks. The hierarchical database includes a plurality of nodes representing the plurality of code chunks, and relationships between the plurality of nodes representing dependencies among the plurality of code chunks. Additionally, the method involves traversing the plurality of nodes in the hierarchical database and generating a set of prompts based on the traversing. Each prompt of the set of prompts includes a respective code chunk of the plurality of code chunks. The method also includes applying a neural language model to the set of prompts and generating a natural language description corresponding to each node of the plurality of nodes based on the applying of the neural language model to the set of prompts. The method includes storing the natural language description corresponding to each node of the plurality of nodes in the hierarchical database.

Further aspects of the present disclosure are directed to systems and computer program products containing functionality consistent with the method described above.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures, wherein.

DETAILED DESCRIPTION

Figure 1:
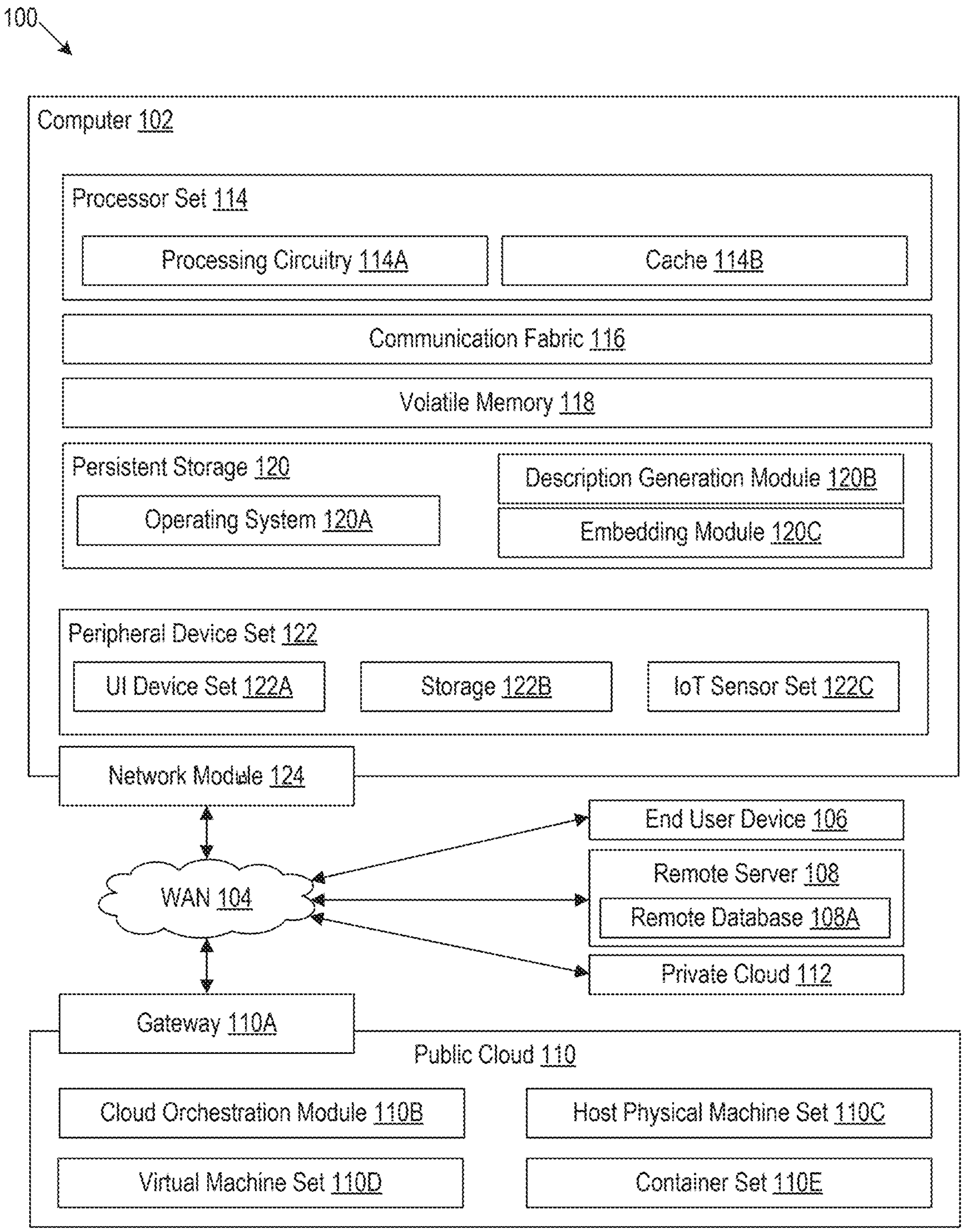
FIG. 1 is a diagram that illustrates a computing environment for analyzing and documenting source code, in accordance with an embodiment of the disclosure.

The documentation and modernization of legacy software systems present significant challenges for organizations seeking to maintain and update their technological infrastructure. Legacy software systems often lack comprehensive documentation, making it difficult for current developers and architects to understand the intricacies of the existing codebase. This lack of documentation slows down modernization efforts and poses risks to business continuity when attempting to update or replace these critical systems.

Traditional approaches to documenting and analyzing legacy code rely heavily on manual processes, which are time-consuming, error-prone, and often incomplete. These methods struggle to capture the full complexity of large-scale systems, especially when dealing with intricate business logic spread across multiple modules or programs. Furthermore, the shortage of subject matter experts familiar with older programming languages and architectures compounds the difficulty of accurately interpreting and documenting legacy code.

To address these challenges, the present disclosure introduces an automated system for documenting and validating legacy software systems. This system employs advanced natural language processing techniques and machine learning models to analyze source code, extract meaningful information, and generate comprehensive documentation. The system processes entire code repositories, breaking down complex applications into manageable components and creating a hierarchical representation of the codebase. The system supports multiple programming languages, including COBOL and object-oriented languages like Java. This language-agnostic approach allows organizations to document and modernize heterogeneous software environments that may include a mix of legacy and more recent technologies.

In some cases, the system generates natural language summaries in multiple languages. This feature facilitates collaboration among global development teams and ensures that documentation is accessible to stakeholders regardless of their primary language. The multilingual capability enhances knowledge sharing and reduces the risk of misinterpretation during modernization projects.

The system may be implemented in various forms to suit different organizational needs and workflows. In some cases, the system operates as a batch process for analyzing entire code repositories, allowing for comprehensive documentation of large-scale systems. In some cases, the system may be integrated as an interactive tool within integrated development environments (IDEs). This integration enables developers to access documentation and analysis features directly within their familiar coding environment. For broader accessibility, the system may include a web interface for selecting and analyzing code. This approach allows users to interact with the system through a browser, facilitating collaboration and enabling access from various devices and locations. The backend processing for these implementations typically occurs on cloud infrastructure, providing scalability and performance to handle large codebases and complex analyses.

The system's approach to documentation and analysis extends beyond traditional legacy systems. In some cases, the system may be applied to modern software architectures, including microservices. This adaptability ensures that organizations can maintain comprehensive documentation and understanding of their software assets across different architectural paradigms. By automating the process of code analysis and documentation generation, the system offers several advantages over manual methods. The system improves efficiency by significantly reducing the time required to document large codebases. The use of machine learning models enhances accuracy and consistency in interpreting code structures and business logic.

Furthermore, the system's ability to generate structured, searchable documentation facilitates knowledge transfer within organizations. This feature is particularly valuable when onboarding new team members or when preparing for system modernization projects. The automated validation capabilities help ensure that modernized implementations accurately reflect the business logic of the original legacy systems, reducing the risk of errors during migration or redevelopment efforts.

In various embodiments of the disclosure, a computer-implemented method is described. The method includes receiving, by a computer, file data associated with a source code repository of a computer-executable application. The method further includes extracting, by the computer, a plurality of code chunks from the file data. The method further includes generating, by the computer, a hierarchical database based on the plurality of code chunks, the hierarchical database comprising a plurality of nodes representing the plurality of code chunks, and relationships between the plurality of nodes representing dependencies among the plurality of code chunks. The method further includes traversing, by the computer, the plurality of nodes in the hierarchical database. The method further includes generating, by the computer, a set of prompts based on the traversing of the plurality of nodes. Each prompt of the set of prompts includes a respective code chunk of the plurality of code chunks. The method further includes applying, by the computer, a neural language model to the set of prompts and generating, by the computer, a natural language description corresponding to each node of the plurality of nodes based on the applying of the neural language model to the set of prompts. The method further includes storing, by the computer, the natural language description corresponding to each node of the plurality of nodes in the hierarchical database. This approach advantageously automates the documentation process for complex codebases, significantly reducing the time and effort required for manual documentation while ensuring comprehensive coverage of all code components.

In various embodiments of the disclosure, the method further includes dividing, by the computer, the computer-executable application into a plurality of application components based on the file data. The plurality of application components is executable based on the dependencies between the plurality of application components, and the plurality of code chunks correspond to an application component of the plurality of application components. This division enables modular analysis of large applications, making the documentation process more manageable and allowing for parallel processing of different application components, thereby improving overall system efficiency.

In various embodiments of the disclosure, the natural language description includes a logic associated with the respective code chunk, business rules associated with the respective code chunk, and input and output parameter specification associated with the respective code chunk. This comprehensive description provides a complete understanding of each code chunk's functionality, business context, and interface requirements, facilitating knowledge transfer between technical and non-technical stakeholders and supporting more effective maintenance and modernization efforts.

In various embodiments of the disclosure, the plurality of code chunks corresponds to the application component, and the natural language description that corresponds to a root node of the plurality of nodes is a component-wide description of the application component. This hierarchical organization provides both detailed low-level descriptions and high-level component overviews, enabling users to understand the system at multiple levels of abstraction and facilitating both detailed technical work and strategic planning.

In various embodiments of the disclosure, the method further includes generating, by the computer, a hierarchical representation that represents the plurality of application components as a plurality of component-level nodes in the hierarchical database. Each component-level node of the plurality of component-level nodes is associated with the component-wide description of the application component, and the application component corresponds to a respective component-level node of the plurality of component-level nodes. The method further includes traversing, by the computer, the plurality of component-level nodes to generate a plurality of component-level prompts. The method further includes applying, by the computer, the neural language model on the set of component-level prompts based on traversing the plurality of component-level nodes. The method further includes generating, by the computer, a component-level description corresponding to each application component of the plurality of application components based on the applying of the neural language model on the set of component-level prompts. This multi-level analysis creates a comprehensive documentation structure that captures both the individual components and their interactions within the larger system, providing valuable insights into system architecture and facilitating more effective system-wide understanding and maintenance.

In various embodiments of the disclosure, each code chunk of the plurality of code chunks is a computer-executable code chunk that is one of a function, a COBOL paragraph, a procedure, a method, a class, a routine, or a script. This language-agnostic approach supports documentation of diverse codebases including both legacy systems (such as COBOL) and modern programming paradigms, making the system versatile for organizations with heterogeneous technology stacks and enabling comprehensive documentation across multiple generations of software.

In various embodiments of the disclosure, the hierarchical database is based on a tree data structure. Each record of the hierarchical database includes node content of a respective node of the plurality of nodes, and each record of the hierarchical database is linked to one or more different records of the hierarchical database. This structured approach enables efficient navigation and querying of the codebase documentation, preserves the natural hierarchical relationships between code components, and facilitates tracing of dependencies between different parts of the application.

In various embodiments of the disclosure, the method further includes generating, by the computer, metadata for each node of the plurality of nodes based on the respective code chunk of the plurality of code chunks. The metadata includes a hash of the respective code chunk of the plurality of code chunks and a node identifier (ID) for the respective code chunk. The method further includes storing, by the computer, node content for each node of the plurality of nodes in the hierarchical database. The node content includes the respective code chunk and the generated metadata for the respective code chunk. This metadata generation enables efficient version tracking, change detection, and content verification, ensuring documentation remains synchronized with the codebase and providing a reliable mechanism for identifying when code has been modified.

In various embodiments of the disclosure, the method further includes determining, by the computer, a parent node from the hierarchical database for each node of the plurality of nodes, except for a root node of the plurality of nodes, based on the dependencies. The method further includes updating, by the computer, the metadata for each node of the plurality of nodes based on a parent node ID of the determined parent node for a respective node of the plurality of nodes. This parent-child relationship tracking creates a complete dependency map of the application, enabling impact analysis for potential changes, facilitating more effective debugging, and providing insights into the structural organization of the codebase.

In various embodiments of the disclosure, the plurality of nodes includes a set of leaf nodes, a set of non-leaf nodes, and a root node. Each node of the plurality of nodes, except the set of leaf nodes, depends on a respective set of child nodes of the plurality of nodes. The traversing includes: selecting, by the computer, the set of leaf nodes in a specific order; selecting, by the computer, each non-leaf node of the set of non-leaf nodes based on the selecting of the set of leaf nodes and a count of leaf nodes that depend on a respective non-leaf node of the set of non-leaf nodes; and selecting, by the computer, the root node based on the selecting of each non-leaf node of the set of non-leaf nodes. This bottom-up traversal approach ensures that all dependencies are properly analyzed before their dependent components, resulting in more accurate and contextually rich descriptions that incorporate information from all relevant sub-components.

In various embodiments of the disclosure, the set of prompts includes a first subset of prompts for the set of leaf nodes, a second subset of prompts for the set of non-leaf nodes, and a third prompt for the root node. This specialized prompt structure tailors the analysis to each node's position in the hierarchy, enabling more precise and relevant descriptions that account for the different roles and contexts of leaf, intermediate, and root components within the application.

In various embodiments of the disclosure, each of the first subset of prompts includes the respective code chunk associated with a respective leaf node of the set of leaf nodes, and a first base instruction to generate the natural language description corresponding to the respective leaf node. This leaf node-specific approach focuses the analysis on the fundamental building blocks of the application, ensuring detailed and accurate descriptions of the most granular functional units without being influenced by higher-level contextual information.

In various embodiments of the disclosure, each of the second subset of prompts and the third prompt includes the respective code chunk associated with a respective non-leaf node of the set of non-leaf nodes, the natural language description corresponding to each child node of the respective set of child nodes of the respective non-leaf node, and a second base instruction to generate the natural language description corresponding to the respective non-leaf node. This contextually-enriched approach enables the generation of more comprehensive descriptions for higher-level code components by incorporating information from their dependencies, resulting in documentation that accurately reflects how components interact and function together.

In various embodiments of the disclosure, the third prompt includes the respective code chunk associated with the root node, the natural language description corresponding to each child node of the respective set of child nodes of the root node, and a third base instruction to generate the natural language description corresponding to the root node. This root node-specific approach produces a high-level overview of the entire application component that synthesizes information from all sub-components, providing stakeholders with a comprehensive understanding of the component's overall purpose, functionality, and structure.

In various embodiments of the disclosure, the method further includes generating, by the computer, vector embedding data of the natural language description corresponding to each node of the plurality of nodes. The method further includes storing, by the computer, vector embedding data of the natural language description corresponding to each node of the plurality of nodes in the hierarchical database. This vector embedding approach enables semantic search capabilities, similarity analysis between code components, and more intelligent querying of the documentation, significantly enhancing the system's ability to retrieve relevant information based on natural language queries.

In various embodiments of the disclosure, the method further includes receiving, by the computer, a natural language query associated with an aspect of the computer-executable application via a user interface of a user device. The method further includes executing, by the computer, a vector search across the hierarchical database based on the natural language query and the stored vector embedding data for each node of the plurality of nodes. The method further includes determining, by the computer, at least one node of the plurality of nodes pertaining to the natural language query based on the executing of the vector search. The method further includes extracting, by the computer, node content corresponding to each of the at least one node from the hierarchical database. The method further includes generating, by the computer, a natural language response to the natural language query based on node content corresponding to each of the at least one node. The method further includes controlling, by the computer, the user device to render the natural language response on the user interface. This natural language query capability allows access to codebase knowledge, allowing non-technical stakeholders to obtain information about the application without requiring programming expertise, and enabling faster information retrieval compared to manual code inspection.

In various embodiments of the disclosure, the method further includes receiving, by the computer, a process documentation that defines a specific execution flow of a plurality of application components of the computer-executable application. The method further includes generating, by the computer, vector embedding data of the process documentation. The method further includes computing, by the computer, a similarity score between the vector embedding data of the process documentation and the vector embedding data of the natural language description corresponding to each node of the plurality of nodes. The method further includes validating, by the computer, the process documentation based on the similarity score being above a threshold. This validation capability ensures consistency between process documentation and actual code implementation, reducing the risk of documentation drift, identifying potential discrepancies between documented processes and actual code behavior, and providing a mechanism for verifying the accuracy of existing documentation.

In various embodiments of the disclosure, the method further includes receiving, by the computer, an instruction that includes the natural language description corresponding to a specific node of the plurality of nodes. The method further includes applying, by the computer, the neural language model on the instruction. The method further includes generating, by the computer, a specific code chunk in a specific programming language that is different from a programming language associated with the plurality of code chunks. The generating of the specific code chunk is based on the applying of the neural language model on the instruction. The method further includes controlling, by the computer, a user device to render the specific code chunk on a user interface of the user device. This code generation capability supports modernization efforts by facilitating the translation of legacy code to modern programming languages, accelerating migration projects, and enabling developers to quickly prototype equivalent functionality in different technologies based on the natural language understanding of existing code.

In various embodiments of the disclosure, a computer system is described. The system includes a processor set, one or more computer-readable storage media, and program instructions stored on the one or more computer-readable storage media, the program instructions executable by the processor set to cause the processor set to receive file data associated with a source code repository of a computer-executable application and extract a plurality of code chunks from the file data. The program instruction further cause the processor set to generate a hierarchical database based on the plurality of code chunks. The hierarchical database includes a plurality of nodes representing the plurality of code chunks, and relationships between the plurality of nodes representing dependencies among the plurality of code chunks. The program instruction further cause the processor set to traverse the plurality of nodes in the hierarchical database and generate a set of prompts based on the traversal. Each prompt of the set of prompts includes a respective code chunk of the plurality of code chunks. The program instruction further cause the processor set to apply a neural language model to the set of prompts; generate a natural language description corresponding to each node of the plurality of nodes based on the application of the neural language model to the set of prompts; and store the natural language description corresponding to each node of the plurality of nodes in the hierarchical database.

In various embodiments of the disclosure, a computer-program product is described. The product includes one or more computer-readable storage media, and program instructions stored on the one or more computer-readable storage media to perform operations. The operations include receiving file data associated with a source code repository of a computer-executable application and extracting a plurality of code chunks from the file data. The operations further include generating a hierarchical database based on the plurality of code chunks. The hierarchical database includes a plurality of nodes representing the plurality of code chunks, and relationships between the plurality of nodes representing dependencies among the plurality of code chunks. The operations further include traversing the plurality of nodes in the hierarchical database and generating a set of prompts based on the traversing of the plurality of nodes. Each prompt of the set of prompts includes a respective code chunk of the plurality of code chunks. The operations further include applying a neural language model to the set of prompts, generating a natural language description corresponding to each node of the plurality of nodes based on the applying of the neural language model to the set of prompts, and storing the natural language description corresponding to each node of the plurality of nodes in the hierarchical database.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks are performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for analyzing and documenting source code, in accordance with an embodiment of the disclosure. With reference to FIG. 1, there is shown a computing environment 100 that contains an example of an environment for the execution of at least some of the computer code involved in performing the disclosed methods, such as a description generation module 120B and an embedding module 120C. In addition to the description generation module 120B and the embedding module 120C, computing environment 100 includes, for example, a computer 102, a wide area network (WAN) 104, an End User Device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A, the description generation module 120B, and the embedding module 120C, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or a wearable computer, a mainframe computer, a quantum computer, or any various forms of a computer or a mobile device now known or to be developed in the future that is capable of running a program, accessing a network or querying a database, such as the remote database 108A. As is well understood in the art of computer technology, and depending upon the technology, the performance of a computer-implemented method may be distributed among multiple computers and/or between multiple locations. In this presentation of the computing environment 100, detailed discussion is focused on a single computer, specifically the computer 102, to keep the presentation as simple as possible. The computer 102 may be located in a cloud, even though it is not shown in a cloud in FIG. 1. The computer 102 is not required to be in a cloud except to any extent as is affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the various storage media discussed below. The program instructions, and associated data, are accessed by the processor set 114 to control and direct the performance of the disclosed methods. In computing environment 100, at least some of the instructions for performing the disclosed methods may be stored in the dynamic modification of the description generation module 120B and the embedding module 120C in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Various types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the description generation module 120B and the embedding module 120C typically includes at least some of the computer code involved in performing the disclosed methods.

The peripheral device set 122 includes the set of peripheral devices of computer 102. Data communication connections between the peripheral devices and the various components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A includes components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, a first sensor may be a thermometer, and a second sensor may be a motion detector.

The network module 124 is the collection of computer software, hardware, and firmware that allows computer 102 to communicate with various computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by various computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or various computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
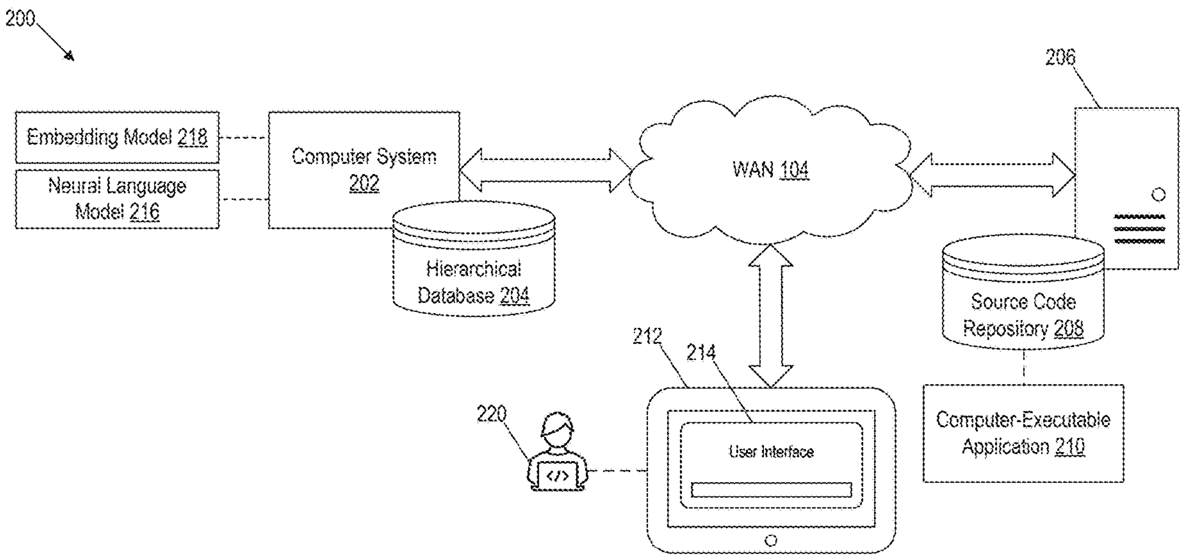
FIG. 2 is a diagram that illustrates a network environment for analyzing and documenting source code, in accordance with an embodiment of the disclosure.

FIG. 2 is a diagram that illustrates a network environment 200 for analyzing and documenting source code, in accordance with an embodiment of the disclosure. The network environment 200 includes a computer system 202, a hierarchical database 204, a server 206, a source code repository 208, a computer-executable application 210, a user device 212, a user interface 214, a neural language model 216, an embedding model 218, and a user 220. The network environment 200 further includes WAN 104 (as described in FIG. 1). In an embodiment of the disclosure, the user device 212 is an exemplary embodiment of the End User Device 106 of FIG. 1. Similarly, the computer system 202 is an exemplary embodiment of the computer 102 in FIG. 1.

The computer system 202 includes suitable logic, circuitry, and/or interfaces for receiving file data, extracting code chunks, generating hierarchical databases, and applying neural language models. The computer system 202 may include a processor set, one or more computer-readable storage media, and program instructions stored on the one or more computer-readable storage media that are executable by the processor set. In some implementations, the computer system 202 may be configured with specialized hardware accelerators optimized for natural language processing tasks to enhance the performance of the neural language model processing. Examples of such hardware accelerators may include, but are not limited to, high-performance graphics processing units, tensor processing units, specialized AI accelerator chips, multi-core accelerator cards, matrix operation processors, or custom field-programmable gate array implementations designed for matrix operations.

In some cases, the computer system 202 may receive file data associated with the source code repository 208 of the computer-executable application 210. The computer system 202 may extract a plurality of code chunks from the file data. The computer system 202 may generate the hierarchical database 204 based on the plurality of code chunks. The code chunks may represent various programming constructs such as functions, COBOL paragraphs, procedures, methods, classes, routines, or scripts, allowing the system to process diverse programming languages including both legacy systems like COBOL and modern object-oriented languages like Java®. Examples of code chunks may include, but are not limited to, a COBOL PERFORM paragraph that calculates interest rates, a Java® method that validates user credentials, a Python function that processes data transformations, a C# class that implements payment processing logic, a JavaScript routine that handles form validation, or a PL/SQL stored procedure that updates customer records.

The computer system 202 may be implemented in various configurations to suit different organizational needs and deployment scenarios. Examples of the computer system 202 may include, but are not limited to, a cloud-based virtual machine instance with scalable processing capabilities, a containerized application running on a distributed computing platform, an on-premises enterprise server with dedicated hardware accelerators, a hybrid cloud deployment combining local and remote processing resources, a microservices architecture distributed across multiple computing nodes, a high-performance computing cluster optimized for parallel processing tasks, a serverless computing environment that scales automatically based on workload demands, an edge computing device positioned close to data sources for reduced latency, a multi-tenant software-as-a-service platform serving multiple organizations, a workstation, or a specialized appliance designed specifically for code analysis and documentation generation tasks.

The hierarchical database 204 may include a plurality of nodes representing the plurality of code chunks, and relationships between the plurality of nodes representing dependencies among the plurality of code chunks. In some cases, the hierarchical database 204 may be implemented as a tree data structure with vector embedding capabilities, allowing for semantic search and similarity comparisons. Each record in the hierarchical database 204 may include node content including the respective code chunk, metadata such as a hash of the code chunk and a node identifier, and vector embedding data representing the semantic content of the natural language descriptions. The vector database implementation enables efficient similarity searches, allowing users to find relevant code components based on natural language queries even when exact keyword matches are not present.

In some cases, the hierarchical database 204 may utilize dimensionality reduction techniques to optimize storage and retrieval of vector embeddings while maintaining semantic relationships between code chunks. The hierarchical structure combined with vector representations enables efficient navigation and querying of the codebase documentation while preserving both the natural hierarchical relationships between code chunks and the semantic similarities between code chunks. Example implementations of the hierarchical database 204 may include, but are not limited to, graph databases with vector extensions, document-oriented databases with tree structures and vector indexes, relational databases with tree extensions and vector capabilities, vector databases with hierarchical clustering, semantic vector databases, or custom implementations using in-memory databases with graph and vector similarity modules.

The server 206 may be a computing device that provides services to other devices within the network environment 200. In some cases, the server 206 may host the source code repository 208 and the computer-executable application 210. The server 206 may be implemented as a physical server, a virtual machine, or a container in a cloud environment, providing scalability to handle large codebases and complex analyses. Examples implementations of the server 206 may include, but are not limited to, a cloud-based virtual server instance running a code repository, a cloud virtual machine hosting a version control system, a cloud platform container cluster running containerized applications, an on-premises rack-mounted server with a version control repository, an enterprise-grade server running a Unix-based operating system with a configuration management repository, or a containerized deployment of a code hosting platform running on an enterprise container orchestration platform.

In at least one embodiment, the server 206 may be implemented as a plurality of distributed cloud-based resources by use of several technologies that are well known to those ordinarily skilled in the art. A person with ordinary skill in the art will understand that the scope of the disclosure may not be limited to the implementation of the server 206 and the computer system 202 as two separate entities. In certain embodiments, the functionalities of the server 206 can be incorporated in its entirety or at least partially in the computer system 202 without a departure from the scope of the disclosure. In certain embodiments, the server 206 may host a copy of the hierarchical database 204.

The source code repository 208 may be a centralized storage system that manages and tracks changes to source code files and related artifacts throughout the software development lifecycle. The source code repository 208 may provide version control capabilities, enabling multiple developers to collaborate on code development while maintaining a complete history of modifications. In some cases, the source code repository 208 may be implemented using distributed version control systems that allow for branching, merging, and distributed development workflows. The source code repository 208 may store various types of files including source code files, configuration files, documentation, build scripts, and deployment artifacts. Examples of source code repositories may include, but are not limited to, distributed version control repositories hosted on cloud-based code hosting platforms, centralized version control repositories, enterprise version control systems, enterprise-scale development repositories, distributed version control systems with alternative architectures, mainframe-based source control systems for enterprise change management, CICS source libraries containing COBOL programs and copybooks, or custom version control systems developed for specific organizational needs.

The computer-executable application 210 may be a software program or system including executable code that performs specific business functions or technical operations. The computer-executable application 210 may be implemented using various programming languages, architectural patterns, and deployment models depending on organizational requirements and technical constraints. In some cases, the computer-executable application 210 may represent legacy systems that have been in operation for extended periods, requiring modernization or documentation efforts. The computer-executable application 210 may include multiple interconnected components, modules, or services that work together to deliver comprehensive functionality. In the case of COBOL programs, the computer-executable application 210 may encompass complex transactional flows or program chains where multiple programs are linked together in a specific sequence to complete business processes, with each program passing control and data to subsequent programs in the chain. For microservices architectures, the computer-executable application 210 may consist of loosely coupled, independently deployable services that communicate through well-defined APIs to form complete business workflows. Examples of computer-executable applications may include, but are not limited to, mainframe COBOL applications for banking and financial services with multi-step transactional flows spanning numerous program components, Customer Information Control System (CICS) transaction processing applications that handle high-volume online transactions through coordinated program chains, Java Enterprise Edition applications running on application servers, .NET Framework applications deployed on Windows servers, Python web applications using frameworks such as Django or Flask, Node.js applications for real-time web services, microservices architectures deployed in containerized environments with orchestrated service interactions, mobile applications, desktop applications, or embedded software applications running on specialized hardware devices.

In the context of CICS specifically, the computer-executable application 210 may include CICS transaction programs written in COBOL, PL/I, or other supported languages, along with associated maps, copybooks, and configuration definitions that collectively provide online transaction processing capabilities for enterprise systems, often involving complex program-to-program communication patterns where one transaction initiates a chain of program executions to complete a business process.

The user device 212 may be an end-user computing device that allows the user 220 to interact with the network environment 200. The user device 212 may include the user interface 214 for displaying information and receiving user input. Examples of the user device 212 may include, but are not limited to, desktop computers, laptop computers, tablet devices, smartphones, thin clients, workstations, specialized terminals, wearable devices, augmented reality headsets, virtual reality headsets, or Internet of Things (IoT) devices with display capabilities. The user interface 214 may provide various visualization options, such as hierarchical tree views of code chunks, side-by-side displays of code and generated descriptions, and interactive query capabilities to explore the codebase. In some implementations, the user interface 214 may be implemented as a web interface, a code editor plugin, or a standalone application, providing flexibility for different user preferences and workflows. Example implementations of the user interface 214 may include, but are not limited to, a JavaScript framework-based web application with data visualization libraries, a code editor extension with syntax highlighting and integrated documentation panels, an integrated development environment plugin with code navigation features, a cross-platform desktop application with customizable layouts, a computational notebook extension for interactive code analysis, or a progressive web application accessible from various devices and platforms.

The neural language model 216 may be a machine learning model configured to process and generate natural language descriptions. In some cases, the computer system 202 may apply the neural language model 216 to a set of prompts, where each prompt of the set of prompts includes a respective code chunk of the plurality of code chunks. The neural language model 216 may be specifically trained or fine-tuned on programming languages and business domains relevant to the application being analyzed, enabling the neural language model 216 to generate accurate and contextually appropriate descriptions. For leaf nodes, the prompts may include only the code chunk and a base instruction, while for non-leaf nodes, the prompts may include the code chunk, descriptions of child nodes, and a base instruction. The architecture of the neural language model 216 is based on neural network components, such as the transformer architecture. Transformers use self-attention mechanisms to capture long-range dependencies and contextual relationships within text, enabling the neural language model 216 to understand and generate coherent descriptions of code functionality. The neural language model 216 may be implemented as a neural network with a plurality of layers, including an input layer, one or more hidden layers, and an output layer. Each layer may contain multiple nodes (artificial neurons) with connections between layers determined by the network's hyperparameters. The neural language model 216 may be implemented using hardware including processors, microprocessors, field-programmable gate arrays (FPGAs), or application-specific integrated circuits (ASICs), or through a combination of hardware and software components.

The neural language model 216 is configured to handle multilingual code content, recognizing and processing code that contains variables, comments, or literals in different spoken languages such as Spanish, French, German, or Japanese. The multilingual capability of the neural language model 216 enables the system to accurately analyze and document legacy applications developed in regions where non-English programming practices are common. Examples of the neural language model 216 may include, but are not limited to, Bidirectional Encoder Representations from Transformers (BERT) models, Generative Pre-trained Transformer (GPT) models and variants thereof, Text-to-Text Transfer Transformer (T5) models, large transformer-based language models fine-tuned on programming documentation, advanced language models with specialized code understanding capabilities, open-source code-focused language models adapted for legacy languages, general-purpose language models with code analysis extensions, programming-specific transformer models, pre-trained code understanding models, encoder-decoder architectures, hierarchical neural language models, multilingual code understanding models, or domain-specific small language models optimized for particular programming languages like COBOL or PL/I.

In some implementations, the neural language model 216 may be implemented as a small language model specifically trained on vocabulary of computer-executable code of legacy and modern programming languages. The small language model implementation may provide computational efficiency while maintaining accuracy for code analysis tasks. The small language model may be trained on a curated dataset including code samples from legacy programming languages such as COBOL, FORTRAN, PL/I, and Assembler, as well as modern programming languages including Java, Python, C, JavaScript, and Go. The training dataset may include business domain-specific terminology and patterns commonly found in enterprise applications, enabling the small language model to understand both technical programming constructs and business logic contexts. The model's training data incorporates code samples containing variable names, comments, and string literals in multiple spoken languages. The multilingual training enables the small language model to accurately interpret code regardless of the natural language used within the code, and to generate descriptions in the user's preferred language. The small language model may utilize a reduced parameter count compared to large language models, allowing for faster inference times and lower computational resource requirements while maintaining specialized knowledge of programming languages and software development patterns. The small language model architecture may incorporate domain-specific tokenization strategies that recognize programming language keywords, variable naming conventions, and code structure patterns across different programming paradigms, while also handling non-English character sets and linguistic constructs. In some cases, the small language model may be fine-tuned using transfer learning techniques, starting from a general-purpose multilingual language model and adapting the general-purpose multilingual language model to the specific vocabulary and patterns of software code analysis across different human languages.

The embedding model 218 may be a component that converts input data into a format suitable for processing by the neural language model 216. In some cases, the embedding model 218 may generate vector representations of code chunks or natural language descriptions. The vector representations enable semantic search capabilities across the codebase, allowing users to find relevant code components based on natural language queries. The embedding model 218 may also facilitate similarity analysis between different code components or between code descriptions and process documentation, supporting validation of modernized implementations against legacy systems. Examples of the embedding model 218 may include, but are not limited to, general-purpose text embedding models, universal sentence encoding systems, neural network-based sentence representation models, transformer-based sentence embedding frameworks, contextual embedding models, multilingual embedding systems, or specialized code embedding models designed for programming language understanding.

The user 220 may be an individual who interacts with the computer system 202 through the user device 212 and user interface 214 to analyze, document, or query computer-executable applications such as the computer-executable application 210. The user 220 may represent various roles within an organization, including software developers, system architects, business analysts, project managers, quality assurance engineers, or technical documentation specialists. In some cases, the user 220 may be a legacy system expert familiar with older programming languages and business processes, while in other cases, the user 220 may be a modernization specialist working to understand and transform existing systems. The user 220 may also include non-technical stakeholders such as business users, compliance officers, or executive decision-makers who need to understand system functionality without requiring deep programming knowledge. The user 220 may interact with the system to perform various tasks, such as generating natural language descriptions of code components, querying the system about specific business logic or processes, validating modernized implementations against legacy systems, or extracting documentation for compliance or knowledge transfer purposes. The user 220 may access the system through different interfaces depending on their role and technical expertise, ranging from web-based interfaces for business users to integrated development environment plugins for software developers.

Figure 3:
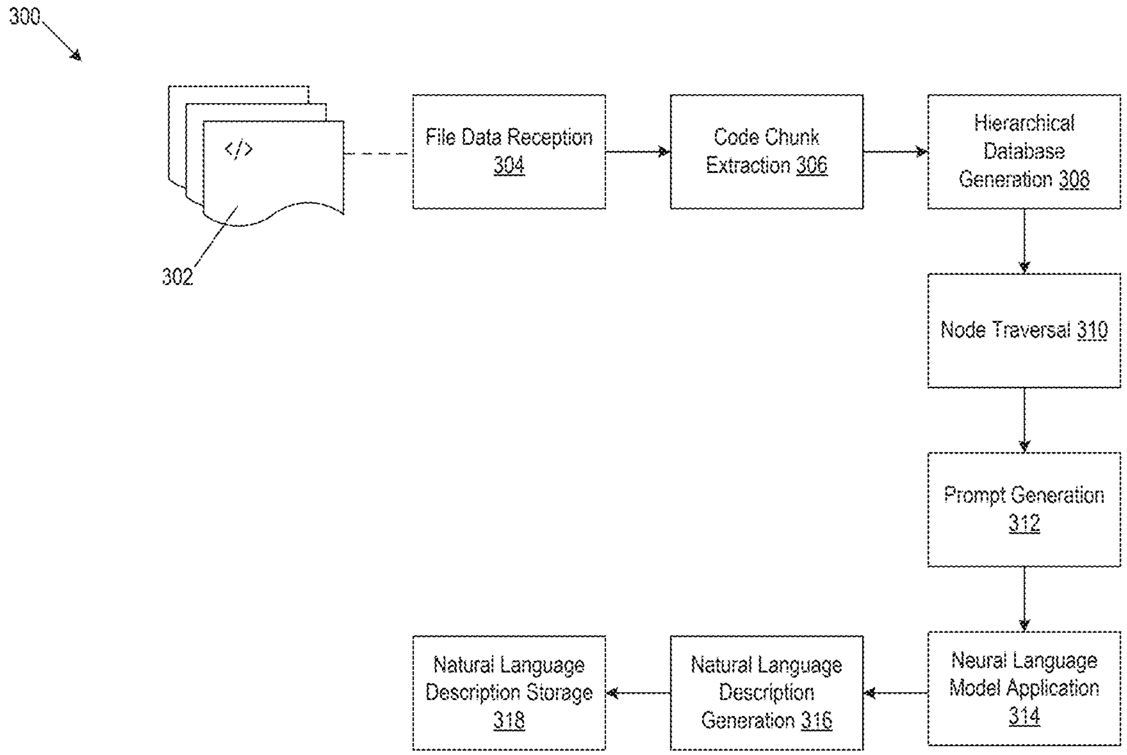
FIG. 3 is a system diagram showing a sequence for processing and generating descriptions from file data, in accordance with an embodiment of the disclosure.

FIG. 3 is a sequence diagram that illustrates exemplary operations for analyzing and generating descriptions from file data, in accordance with an embodiment of the disclosure. FIG. 3 is explained in conjunction with elements from FIG. 2. With reference to FIG. 3, there is shown a sequence diagram 300 that includes operations from 304 to 318. The operations from 302 to 318 may be executed by the computer system 202 of FIG. 2.

At 304, the operations may include reception of file data associated with a source code repository of a computer-executable application. The computer system 202 may be configured to receive file data 302 associated with the source code repository 208 of the computer-executable application 210. The file data 302 may include source code files in various programming languages, such as COBOL, Java®, Python, C#, JavaScript, or PL/SQL For example, the file data 302 may include COBOL programs from a mainframe banking application, Java® classes from a web-based customer portal, or a combination of programs from different programming languages within a single application ecosystem.

At 306, the operations may include extraction of a plurality of code chunks from the file data 302. The computer system 202 may extract the plurality of code chunks from the received file data 302. Each code chunk may be a computer-executable code chunk that is one of a function, a COBOL paragraph, a procedure, a method, a class, a routine, or a script. For example, the computer system 202 may extract COBOL PERFORM paragraphs that calculate interest rates, Java® methods that validate user credentials, Python functions that process data transformations, C# classes that implement payment processing logic, JavaScript routines that handle form validation, or PL/SQL stored procedures that update customer records. In the case of COBOL programs, the extraction process accounts for transactional flows or program chains where multiple programs are linked together in a specific sequence to complete business processes, with each program passing control and data to subsequent programs in the chain. The plurality of code chunks typically corresponds to one program (referred to as an application component), while in modern implementations, such chunks may correspond to one or more microservices that communicate through APIs to form complete business workflows. The extraction process may involve parsing the source code in the file data 302 to identify logical units of functionality while preserving their hierarchical relationships and dependencies.

At 308, the operations may include generation of a hierarchical database based on the plurality of code chunks. The computer system 202 may generate the hierarchical database 204 based on the plurality of code chunks. The hierarchical database 204 may include a plurality of nodes representing the plurality of code chunks, and relationships between the plurality of nodes representing dependencies among the plurality of code chunks. The hierarchical database 204 may be based on a tree data structure, where each record of the hierarchical database 204 includes node content of a respective node of the plurality of nodes, and each record of the hierarchical database 204 is linked to one or more different records of the hierarchical database 204. The computer system 202 may generate metadata for each node based on the respective code chunk. The metadata includes a hash of the respective code chunk and a node identifier (ID) for the respective code chunk. The computer system 202 also determines a parent node from the hierarchical database 204 for each node, except for a root node, based on the dependencies, and updates the metadata for each node based on a parent node ID of the determined parent node.

At 310, the operations may include traversal of the plurality of nodes in the hierarchical database 204. The computer system 202 may traverse the plurality of nodes in the hierarchical database 204. The plurality of nodes may include a set of leaf nodes, a set of non-leaf nodes, and a root node, where each node of the plurality of nodes, except the set of leaf nodes, depends on a respective set of child nodes of the plurality of nodes. The traversing may include: selecting the set of leaf nodes in a specific order; selecting each non-leaf node of the set of non-leaf nodes based on the selecting of the set of leaf nodes and a count of leaf nodes that depend on a respective non-leaf node of the set of non-leaf nodes; and selecting the root node based on the selecting of each non-leaf node of the set of non-leaf nodes. Specifically, this bottom-up traversal approach implements a mathematical selection rule where a non-leaf node N is selected for processing only when all of the non-leaf node N's child nodes have been processed, which can be expressed as: Select(N)=true if and only if $\forall c \in$Children(N): Processed(c)=true, where Children(N) represents the set of all child nodes of node N, and Processed(c) indicates whether child node c has been processed. This ensures that descriptions for higher-level components incorporate information from all their dependencies, resulting in comprehensive and contextually accurate documentation that reflects the hierarchical nature of the codebase. For example, when analyzing a banking application's transaction processing module, the computer system 202 first processes all leaf nodes representing individual validation functions before analyzing the parent transaction validation component that uses these functions. This bottom-up traversal approach ensures that all dependencies are properly analyzed before their dependent components, resulting in more accurate and contextually rich descriptions that incorporate information from all relevant sub-components.

At 312, the operations may include generation of a set of prompts based on the traversing. The computer system 202 may generate the set of prompts based on the traversing of the plurality of nodes. Each prompt of the set of prompts may include a respective code chunk of the plurality of code chunks. The set of prompts may include a first subset of prompts for the set of leaf nodes, a second subset of prompts for the set of non-leaf nodes, and a third prompt for the root node. Each of the first subset of prompts may include the respective code chunk associated with a respective leaf node of the set of leaf nodes, and a first base instruction to generate the natural language description corresponding to the respective leaf node, such as "Analyze this COBOL paragraph and describe its business logic, business rules, and input/output parameters." Each of the second subset of prompts and the third prompt may include the respective code chunk associated with a respective non-leaf node of the set of non-leaf nodes, the natural language description corresponding to each child node of the respective set of child nodes of the respective non-leaf node, and a second base instruction to generate the natural language description corresponding to the respective non-leaf node, such as "Based on the provided code and the descriptions of its component parts, provide a comprehensive description of this module's business logic, business rules, and input/output parameters." This prompt structure tailors the analysis to each node's position in the hierarchy. The third prompt for the root node may specifically include instructions, such as "Synthesize the entire COBOL program's functionality based on the provided code and descriptions of its child nodes. Create a comprehensive program-level description that explains the overall business purpose, key workflows, main business rules, and complete input/output specifications." This root node prompt is particularly important as the root node prompt generates a holistic program-level description that captures the overall business function of the entire program, integrating the relationships between different paragraphs and providing business stakeholders with a complete understanding of the program's purpose within the computer-executable application 210.

At 314, the operations may include application of a neural language model to the set of prompts. The computer system 202 may apply the neural language model 216 to the set of prompts in the sequential order established during the traversal at 312, ensuring that each prompt is processed according to its hierarchical position. The neural language model 216 may be implemented in various forms, including but not limited to large language models, small language models, or specialized models trained on vocabulary of computer-executable code of legacy and modern programming languages. When implemented as a specialized model, the neural language model 216 may be trained on a curated dataset including code samples from legacy programming languages such as COBOL, FORTRAN, PL/I, and Assembler, as well as modern programming languages including Java®, Python, C, JavaScript, and Go. The dataset may incorporate code samples containing variable names, comments, and string literals in multiple spoken languages, such as Spanish, French, German, and Japanese.

At 316, the operations may include generation of natural language descriptions corresponding to each node of the plurality of nodes. The computer system 202 may generate the natural language descriptions corresponding to each node of the plurality of nodes based on the application of the neural language model 216 to the set of prompts. The generation process follows the sequential order established during the traversal, where each node is processed only after all the node's child nodes have been processed. For each selected node during traversal, the computer system 202 generates a comprehensive natural language description that includes the logic associated with the respective code chunk, business rules associated with the respective code chunk, and input and output parameter specifications associated with the respective code chunk. The computer system 202 may also generate vector embedding data of the natural language description corresponding to each node and store this vector embedding data in the hierarchical database 204. This vector embedding approach enables semantic search capabilities, similarity analysis between code components, and AI-based querying of the documentation. For example, when analyzing a COBOL paragraph that calculates interest rates such as: CALCULATE-INTEREST SECTION. IF ACCOUNT-BALANCE<1000 MOVE 0.005 TO INTEREST-RATE ELSE IF ACCOUNT-BALANCE<=10000 MOVE 0.012 TO INTEREST-RATE ELSE MOVE 0.018 TO INTEREST-RATE END-IF. COMPUTE MONTHLY-INTEREST-AMOUNT=ACCOUNT-BALANCE*INTEREST-RATE/12. IF ACCOUNT-TYPE='PREMIUM' AND CUSTOMER-LOYALTY-YEARS>5 COMPUTE MONTHLY-INTEREST-AMOUNT=MONTHLY-INTEREST-AMOUNT*1.1 END-IF. EXIT, the computer system 202 might generate a description like: "This paragraph calculates monthly interest based on account balance, tier-based interest rates, and customer loyalty status. Business rules: (1) Accounts with balances below $1000 receive 0.5% annual interest, (2) Accounts with balances between $1000-$10000 receive 1.2% annual interest, (3) Accounts with balances above $10000 receive 1.8% annual interest, (4) Premium accounts with customer loyalty exceeding 5 years receive an additional 10% interest bonus. Input parameters: ACCOUNT-BALANCE (numeric field representing the current balance), ACCOUNT-TYPE (alphanumeric field indicating account category), CUSTOMER-LOYALTY-YEARS (numeric field representing years as customer). Output parameters: MONTHLY-INTEREST-AMOUNT (numeric field containing calculated monthly interest), INTEREST-RATE (numeric field storing the applicable interest rate percentage)."

At 318, the operations may include storage of the natural language descriptions corresponding to each node of the plurality of nodes in the hierarchical database 204. The computer system 202 may store the natural language descriptions corresponding to each node of the plurality of nodes in the hierarchical database 204. The stored descriptions can later be used for various purposes, such as responding to natural language queries about the application, validating process documentation, or generating code in different programming languages. For example, a user might query "How does the system calculate interest for premium accounts?" and the computer system 202 could retrieve relevant descriptions from the hierarchical database 204 to provide a detailed response. Similarly, the computer system 202 could validate whether a modernized Java implementation correctly implements the same business rules as the original COBOL program by comparing the vector embeddings of their respective descriptions.

In some cases, the plurality of code chunks may correspond to an application component, and the natural language description that corresponds to a root node of the plurality of nodes may be a component-wide description of the application component. In a COBOL context, application components might include program modules such as ACCT-MAINT (Account Maintenance), CUST-VALID (Customer Validation), or TRAN-PROC (Transaction Processing), with each component containing multiple paragraphs that implement specific business functions. The computer system 202 may generate a hierarchical representation that represents the plurality of application components as a plurality of component-level nodes in the hierarchical database 204, wherein each component-level node is associated with the component-wide description of the application component. At a transaction level, component-level nodes would represent complete business processes that span multiple COBOL programs, such as a customer onboarding transaction flow that includes programs for data entry (DATA-ENTRY-PGM), validation (VALID-CHECK-PGM), and account creation (ACCT-CREATE-PGM). The computer system 202 may traverse the plurality of component-level nodes to generate component-level prompts, apply the neural language model 216 to these component-level prompts, and generate component-level descriptions for each application component. This hierarchical organization advantageously provides both detailed low-level descriptions and high-level component overviews, enabling users to understand the system at multiple levels of abstraction and facilitating both detailed technical work and strategic planning. For example, a component-wide description might state: "The Customer Onboarding Module (CUST-ONBRD) manages the end-to-end process of registering new customers, including personal information collection (CUST-INFO paragraph), identity verification (ID-VERIFY paragraph), credit assessment (CRED-CHECK paragraph), account creation (ACCT-CREATE paragraph), and welcome package generation (WELCOME-PKG paragraph). The module interfaces with external credit bureaus through the CREDIT-API-CALL paragraph, internal customer databases via the CUST-DB-ACCESS paragraph, and the account management system through the ACCT-INTERFACE paragraph. Key business rules include regulatory compliance checks implemented in the COMPLIANCE-CHK paragraph, fraud prevention measures in the FRAUD-DETECT paragraph, and tiered account offering selection based on customer qualifications in the ACCT-TIER-SELECT paragraph."

Figure 4:
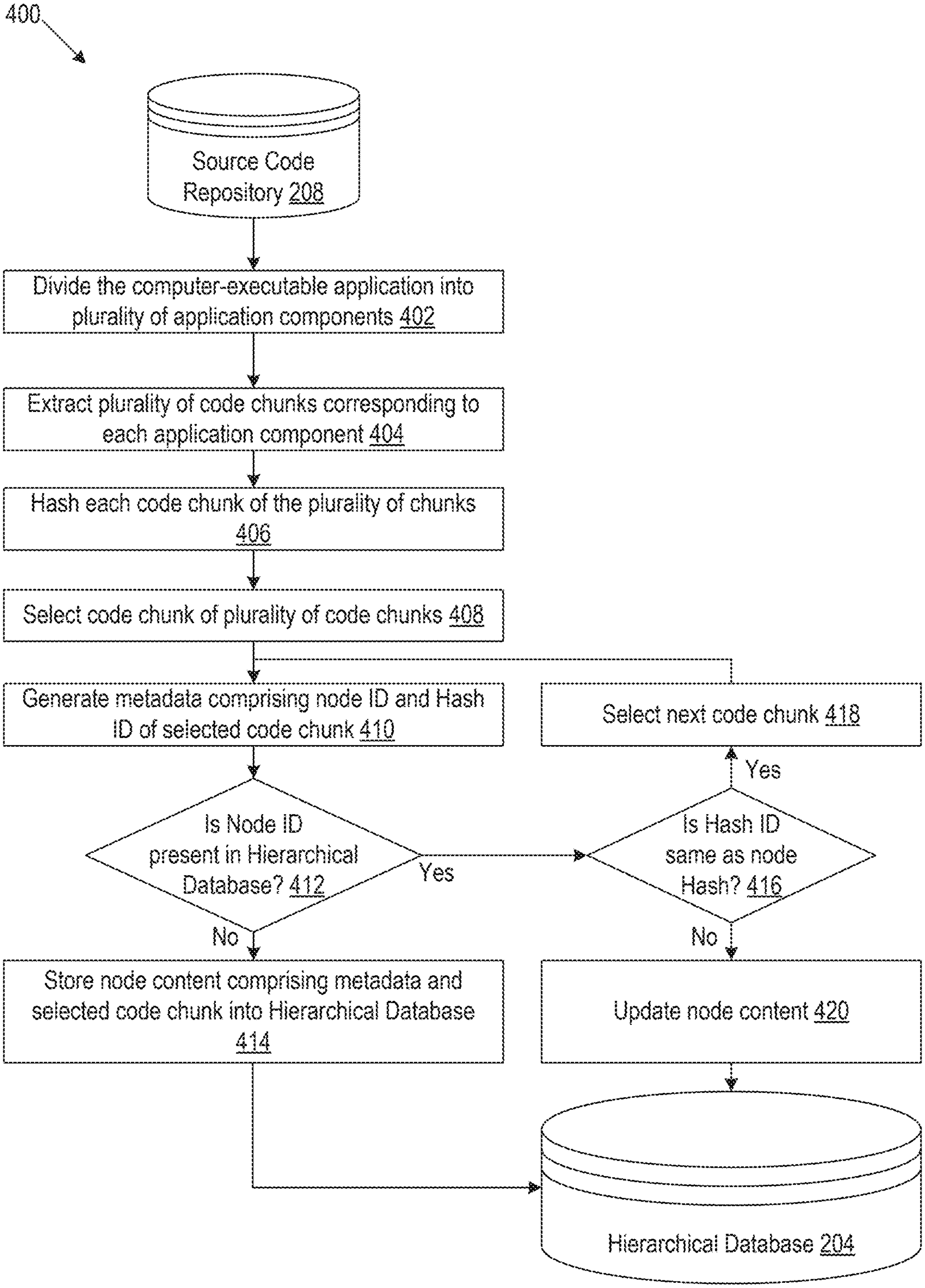
FIG. 4 is a flowchart depicting a process for analyzing and storing code chunks in a hierarchical database, in accordance with an embodiment of the disclosure.

FIG. 4 is a diagram that illustrates a flowchart 400 depicting a process for analyzing and storing code chunks in a hierarchical database 204, in accordance with an embodiment of the disclosure. FIG. 4 is explained in conjunction with elements from FIG. 2. With reference to FIG. 4, there is shown the flowchart 400. The operations of the exemplary method may be executed by the computer system 202 of FIG. 2. The operations of the flowchart 400 may start at 402.

At 402, the operations include dividing the computer-executable application 210 into a plurality of application components based on the file data. In some cases, the computer system 202 may divide the computer-executable application 210 into the plurality of application components based on the file data received from the source code repository 208. The plurality of application components may be executable based on the dependencies between the plurality of application components. For example, in a banking application, the computer system 202 might divide the computer-executable application 210 into components such as "Customer Onboarding," "Account Management," "Transaction Processing," and "Reporting," where the Transaction Processing component depends on Account Management for account validation before processing transactions.

At 404, the operations include extracting a plurality of code chunks corresponding to each application component. The computer system 202 may extract the plurality of code chunks corresponding to each application component of the plurality of application components. In some cases, each code chunk of the plurality of code chunks may be a computer-executable code chunk that is one of a function, a COBOL paragraph, a procedure, a method, a class, a routine, or a script. For example, from a COBOL program in the Transaction Processing component, the computer system 202 might extract paragraphs such as "VALIDATE-TRANSACTION," "PROCESS-DEBIT," "PROCESS-CREDIT," and "UPDATE-BALANCE," each representing a discrete functional unit within the program. Similarly, from a Java class in the Account Management component, the computer system 202 might extract methods like "validateAccountStatus( )" and "updateAccountDetails( )" as individual code chunks.

At 406, the operations include hashing each code chunk of the plurality of chunks. The computer system 202 may generate a hash value for each code chunk of the plurality of code chunks. This hash value may be used as part of the metadata for each node in the hierarchical database 204. The hash value provides an efficient way to detect changes in code chunks during subsequent analyses, enabling the computer system 202 to process only modified code chunks rather than re-analyzing the entire codebase. For example, if a developer modifies the "PROCESS-CREDIT" paragraph to add a new business rule for premium customers, the hash value for that specific code chunk changes, while the hash values for unmodified paragraphs remains the same.

At 408, the operations include selecting a code chunk from the plurality of code chunks. The computer system 202 may select a code chunk from the plurality of code chunks for further processing. The selection process may follow a specific order to ensure all code chunks are processed efficiently, such as processing leaf nodes first before moving to parent nodes that depend on such leaf nodes. Further details related to the selection process are provided at 310 of FIG. 3.

At 410, the operations include generating metadata including node ID and hash ID of the selected code chunk. The computer system 202 may generate metadata for each node of the plurality of nodes based on the respective code chunk (also referred to as the selected code chunk) of the plurality of code chunks. The metadata may include a hash of the selected code chunk and a node identifier (ID) for the selected code chunk. For example, a COBOL paragraph named "CALCULATE-INTEREST" might be assigned a node ID of "ACCT-MGMT-PGM.CALCULATE-INTEREST" and a hash ID that is a SHA-256 hash of the paragraph's content. This metadata enables efficient tracking, retrieval, and version management of code chunks within the hierarchical database 204.

At 412, the operations include checking if the node ID is present in the hierarchical database 204. The computer system 202 determines if the node ID (generated at 410) is already present in the hierarchical database 204. If the node ID is not present (No branch), the process proceeds to 414. If the node ID is present (Yes branch), the process moves to 416. This check allows the computer system 202 to determine whether the computer system 202 needs to create a new node or update an existing one, supporting both initial analysis and incremental updates to the codebase documentation.

At 414, the operations include storing node content including metadata and selected code chunk into the hierarchical database 204. The computer system 202 may store node content for each node of the plurality of nodes in the hierarchical database 204. The node content may include the respective code chunk and the generated metadata for the respective code chunk. For example, when storing a newly identified Java method "calculatePremiumInterest( )" from an Account Management class, the computer system 202 creates a new record in the hierarchical database 204 containing the complete method code, its node ID, hash value, and other relevant metadata such as its position in the class hierarchy.

At 416, the operations include checking if the hash ID is the same as the node hash. If the hash IDs do not match (No branch), the process moves to 420. If the hash IDs match (Yes branch), the process proceeds to 418. This hash comparison enables the computer system 202 to efficiently identify which code chunks have been modified since the last analysis. For example, if a developer has modified the business logic in a "VALIDATE-CUSTOMER" paragraph by changing the minimum age requirement from 18 to 21, the hash value would change, triggering an update to the corresponding node in the hierarchical database 204.

At 418, the operations include selecting the next code chunk. The computer system 202 may select the next code chunk from the plurality of code chunks for processing. This ensures that all code chunks are systematically processed.

At 420, the operations include updating the node content. The computer system 202 may update the node content in the hierarchical database 204 with the new code chunk and metadata. For example, if the "CALCULATE-INTEREST" paragraph has been modified to include a new tier-based interest calculation for premium accounts, the computer system 202 updates the existing node with the new code content, recalculated hash value, and potentially update any parent-child relationships if dependencies have changed. This ensures that the hierarchical database 204 always contains the most current version of each code chunk.

In some cases, the hierarchical database 204 may be based on a tree data structure. Each record of the hierarchical database 204 may include node content of a respective node of the plurality of nodes. Each record of the hierarchical database 204 may be linked to one or more different records of the hierarchical database 204. This tree structure mirrors the natural hierarchical organization of software components, where higher-level functions call lower-level functions, and modules depend on other modules. For example, in a COBOL program, the main procedure might be represented as the root node, with various paragraphs as child nodes, and nested paragraphs as grandchild nodes. Similarly, in an object-oriented application, a class might be represented as a parent node, with its methods as child nodes.

The computer system 202 may determine a parent node from the hierarchical database 204 for each node of the plurality of nodes, except for a root node of the plurality of nodes, based on the dependencies. The computer system 202 may update the metadata for each node of the plurality of nodes based on a parent node ID of the determined parent node for a respective node of the plurality of nodes. For example, in a banking application, the "PROCESS-TRANSACTION" paragraph might be identified as the parent node for "VALIDATE-TRANSACTION," "PROCESS-DEBIT," and "PROCESS-CREDIT" paragraphs based on PERFORM statements in the COBOL code. The metadata for each of these child paragraphs includes the parent node ID "PROCESS-TRANSACTION," establishing the hierarchical relationship. This parent-child relationship tracking creates a complete dependency map of the application, enabling impact analysis for potential changes, facilitating more effective debugging, and providing insights into the structural organization of the codebase.

This process enables efficient analysis and storage of code chunks in the hierarchical database 204, preserving the structure and relationships of the original code while allowing for easy retrieval and analysis of individual components. The hierarchical organization with parent-child relationships, combined with the hash-based change detection, provides a robust foundation for generating comprehensive documentation of the application's business logic and for validating modernized implementations against the original functionality. For example, when modernizing a legacy COBOL banking system to Java®, this hierarchical representation allows the computer system 202 to compare business logic implementations across different technology stacks, ensuring that critical functions like interest calculation or transaction validation maintain consistent business rules despite being implemented in different programming languages.

Figure 5:
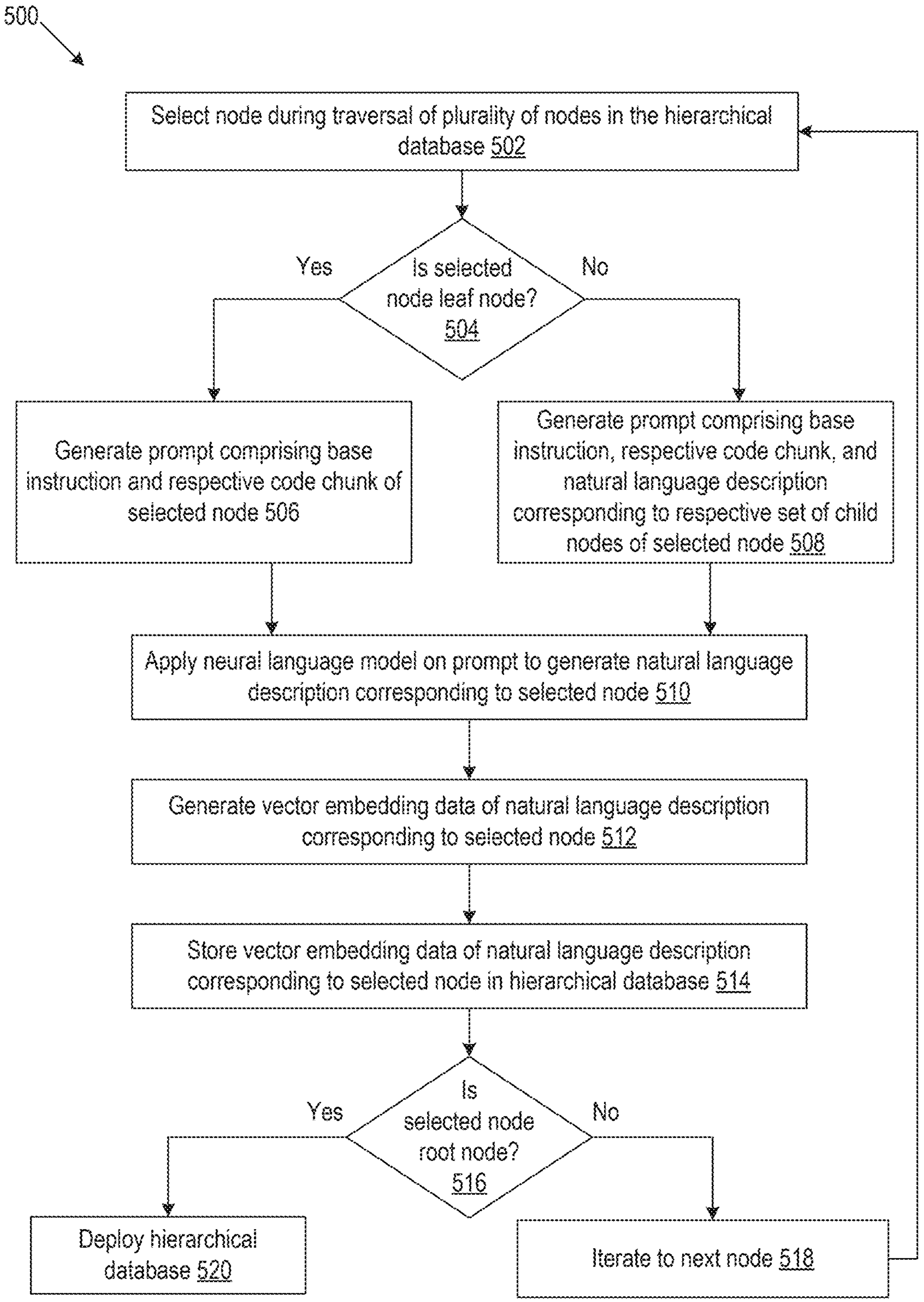
FIG. 5 is a flowchart depicting a process for generating and storing natural language descriptions in a hierarchical database, in accordance with an embodiment of the disclosure.

FIG. 5 is a diagram that illustrates a flowchart 500 depicting a process for generating and storing natural language descriptions in a hierarchical database, in accordance with an embodiment of the disclosure. FIG. 5 is explained in conjunction with elements from FIG. 2. With reference to FIG. 5, there is shown the flowchart 500. The operations of the exemplary method may be executed by the computer system 202 of FIG. 2. The operations of the flowchart 500 may start at 502.

At 502, the operations include selecting a node during traversal of a plurality of nodes in the hierarchical database. The computer system 202 may select a node during traversal of the plurality of nodes in the hierarchical database 204. The plurality of nodes may include a set of leaf nodes, a set of non-leaf nodes, and a root node. Each node of the plurality of nodes, except the set of leaf nodes, may depend on a respective set of child nodes of the plurality of nodes. For example, in a banking application's transaction processing module, the computer system 202 selects nodes representing individual functions like "VALIDATE-TRANSACTION," "PROCESS-DEBIT," or "CALCULATE-INTEREST" during traversal, following the hierarchical structure established during the database generation phase.

At 504, the operations include determining whether the selected node is a leaf node. The computer system 202 may determine whether the selected node is a leaf node. If the selected node is a leaf node, control passes to 506. Otherwise, the control passes to 508. This determination is crucial for the bottom-up traversal approach, as leaf nodes (representing the most granular functional units like individual validation functions or calculation routines) must be processed before their parent nodes to ensure comprehensive context-aware analysis.

At 506, the operations include generating a prompt including a base instruction and respective code chunk of the selected node. The computer system 202 may generate a prompt that includes a base instruction and respective code chunk of the selected node. This prompt may be part of a first subset of prompts for the set of leaf nodes. Each of the first subset of prompts may include the respective code chunk associated with a respective leaf node of the set of leaf nodes, and a first base instruction to generate the natural language description corresponding to the respective leaf node. For example, when processing a leaf node containing a COBOL paragraph that validates customer information, the prompt might include the complete paragraph code along with an instruction like "Analyze this COBOL paragraph and describe its business logic, business rules, and input/output parameters."

At 508, the operations include generating a prompt including base instruction, respective code chunk, and natural language description corresponding to respective set of child nodes of the selected node. The computer system 202 may generate such a prompt. This prompt may be part of a second subset of prompts for the set of non-leaf nodes. Each of the second subset of prompts may include the respective code chunk associated with a respective non-leaf node of the set of non-leaf nodes, the natural language description corresponding to each child node of the respective set of child nodes of the respective non-leaf node, and a second base instruction to generate the natural language description corresponding to the respective non-leaf node. For example, when processing a non-leaf node representing a "PROCESS-TRANSACTION" module that calls several child nodes like "VALIDATE-TRANSACTION," "PROCESS-DEBIT," and "UPDATE-BALANCE," the prompt includes the module's code, the previously generated descriptions of all child nodes, and an instruction like "Based on the provided code and the descriptions of its component parts, provide a comprehensive description of this module's business logic, business rules, and input/output parameters." This contextually-enriched approach advantageously enables the generation of more comprehensive descriptions for higher-level components by incorporating information from their dependencies, resulting in documentation that accurately reflects how code chunks interact and function together.

At 510, the operations include applying a neural language model to the prompt to generate a natural language description corresponding to the selected node. The computer system 202 may apply the neural language model 216 to the prompt to generate a natural language description corresponding to the selected node. The natural language description may include a logic associated with the respective code chunk, business rules associated with the respective code chunk, and input and output parameter specification associated with the respective code chunk. For example, when analyzing a COBOL paragraph that calculates interest rates such as: "CALCULATE-INTEREST SECTION. IF ACCOUNT-BALANCE<1000 MOVE 0.005 TO INTEREST-RATE ELSE IF ACCOUNT-BALANCE<=10000 MOVE 0.012 TO INTEREST-RATE ELSE MOVE 0.018 TO INTEREST-RATE END-IF. COMPUTE MONTHLY-INTEREST-AMOUNT=ACCOUNT-BALANCE*INTEREST-RATE/12. IF ACCOUNT- TYPE='PREMIUM' AND CUSTOMER-LOYALTY-YEARS>5 COMPUTE MONTHLY-INTEREST-AMOUNT=MONTHLY-INTEREST-AMOUNT*1.1 END-IF. EXIT", the system might generate a description like: "This paragraph calculates monthly interest based on account balance, tier-based interest rates, and customer loyalty status. Business rules: (1) Accounts with balances below $1000 receive 0.5% annual interest, (2) Accounts with balances between $1000-$10000 receive 1.2% annual interest, (3) Accounts with balances above $10000 receive 1.8% annual interest, (4) Premium accounts with customer loyalty exceeding 5 years receive an additional 10% interest bonus. Input parameters: ACCOUNT-BALANCE (numeric field representing the current balance), ACCOUNT-TYPE (alphanumeric field indicating account category), CUSTOMER-LOYALTY-YEARS (numeric field representing years as customer). Output parameters: MONTHLY-INTEREST-AMOUNT (numeric field containing calculated monthly interest), INTEREST-RATE (numeric field storing the applicable interest rate percentage)." This comprehensive description provides a complete understanding of each code chunk's functionality, business context, and interface requirements, facilitating knowledge transfer between technical and non-technical stakeholders.

At 512, the operations include generating vector embedding data of the natural language description corresponding to the selected node. The computer system 202 may generate vector embedding data of the natural language description corresponding to the selected node using the embedding model 218. This vector embedding approach enables semantic search capabilities, similarity analysis between code components, and more intelligent querying of the documentation, enhancing the system's ability to retrieve relevant information based on natural language queries. For example, the vector representation of the interest calculation description captures the semantic meaning of concepts like "interest rates," "account balances," "premium accounts," and "loyalty bonuses," allowing users to find this code when searching for related concepts even if they don't use the exact same terminology.

At 514, the operations include storing the vector embedding data of the natural language description corresponding to the selected node in the hierarchical database. The computer system 202 may store the vector embedding data of the natural language description corresponding to the selected node in the hierarchical database 204. This storage of vector embeddings alongside the natural language descriptions enables powerful semantic search capabilities across the codebase. For example, when a user queries "How does the system handle premium customer interest calculations?", the computer system 202 can perform a vector similarity search to identify and retrieve the most relevant code components, even if the exact terms "premium customer" don't appear in the code chunk itself.

At 516, the operations include determining if the selected node is a root node. The computer system 202 may determine if the selected node is a root node. If the selected node is a root node, control passes to 520. Otherwise, the control passes to 518. The root node represents the highest level of the component hierarchy, such as a main program or entry point. For example, in a COBOL program, the root node might represent the main procedure division that orchestrates the overall program flow.

At 518, the operations include iterating to the next node. The computer system 202 may iterate to the next node, which loops back to 502 for continued processing. The computer system 202 may select each non-leaf node of the set of non-leaf nodes based on the selecting of the set of leaf nodes and a count of leaf nodes that depend on a respective non-leaf node of the set of non-leaf nodes. The computer system 202 may select the root node based on the selecting of each non-leaf node of the set of non-leaf nodes. This bottom-up traversal approach implements a mathematical selection rule where a non-leaf node N is selected for processing only when all of the non-leaf node N's child nodes have been processed, which can be expressed as: $\text{Select}(N)=\text{true}$ if and only if $\forall c \in \text{Children}(N)$: $\text{Processed}(c)=\text{true}$, where Children(N) represents the set of all child nodes of node N, and Processed(c) indicates whether child node c has been processed. For example, when analyzing a banking application's transaction processing module, the computer system 202 first process all leaf nodes representing individual validation functions before analyzing the parent transaction validation component that uses these functions.

At 520, the operations include deploying the hierarchical database. The computer system 202 may deploy the hierarchical database 204. This deployment makes the fully processed and documented codebase available for various use cases, such as responding to natural language queries, validating process documentation, or generating code in different programming languages. For example, once deployed, users can query the system with questions like "How does the system calculate interest for premium accounts?" and receive detailed responses based on the stored descriptions and vector embeddings.

In some cases, the computer system 202 may generate a hierarchical representation that represents a plurality of application components as a plurality of component-level nodes in the hierarchical database 204. Each component-level node of the plurality of component-level nodes may be associated with a component-wide description of the application component. The computer system 202 may traverse the plurality of component-level nodes to generate a plurality of component-level prompts. The computer system 202 may apply the neural language model 216 on the set of component-level prompts based on traversing the plurality of component-level nodes. The computer system 202 may generate a component-level description corresponding to each application component of the plurality of application components based on the applying of the neural language model 216 on the set of component-level prompts. This multi-level analysis advantageously creates a comprehensive documentation structure that captures both the individual components and their interactions. For example, in a banking application, component-level nodes represent complete business processes that span multiple COBOL programs, such as a customer onboarding transaction flow that includes programs for data entry (DATA-ENTRY-PGM), validation (VALID-CHECK-PGM), and account creation (ACCT-CREATE-PGM). A component-wide description might state: "The Customer Onboarding Module (CUST-ONBRD) manages the end-to-end process of registering new customers, including personal information collection (CUST-INFO paragraph), identity verification (ID-VERIFY paragraph), credit assessment (CRED-CHECK paragraph), account creation (ACCT-CREATE paragraph), and welcome package generation (WELCOME-PKG paragraph). The module interfaces with external credit bureaus through the CREDIT-API-CALL paragraph, internal customer databases via the CUST-DB-ACCESS paragraph, and the account management system through the ACCT-INTERFACE paragraph."

In some cases, the set of prompts may include a first subset of prompts for the set of leaf nodes, a second subset of prompts for the set of non-leaf nodes, and a third prompt for the root node. The third prompt may include the respective code chunk associated with the root node, the natural language description corresponding to each child node of the respective set of child nodes of the root node, and a third base instruction to generate the natural language description corresponding to the root node. The natural language description that corresponds to a root node of the plurality of nodes may be a component-wide description of the application component. For example, the third prompt for a root node might include instructions like "Synthesize the entire COBOL program's functionality based on the provided code and descriptions of its child nodes. Create a comprehensive program-level description that explains the overall business purpose, key workflows, main business rules, and complete input/output specifications." This root node-specific approach produces a high-level overview of the entire application component that synthesizes information from all sub-components, providing users with a comprehensive understanding of the component's overall purpose, functionality, and structure. For instance, a root node description for a transaction processing program might read: "This program manages the complete lifecycle of financial transactions, including validation (VALIDATE-TRANSACTION paragraph), processing (PROCESS-DEBIT and PROCESS-CREDIT paragraphs), balance updates (UPDATE-BALANCE paragraph), and notification generation (GENERATE-NOTIFICATION paragraph). The program enforces critical business rules including dual authorization for transactions exceeding $10,000, automatic fraud detection for unusual transaction patterns, and compliance with regulatory reporting requirements for international transfers."

Figure 6:
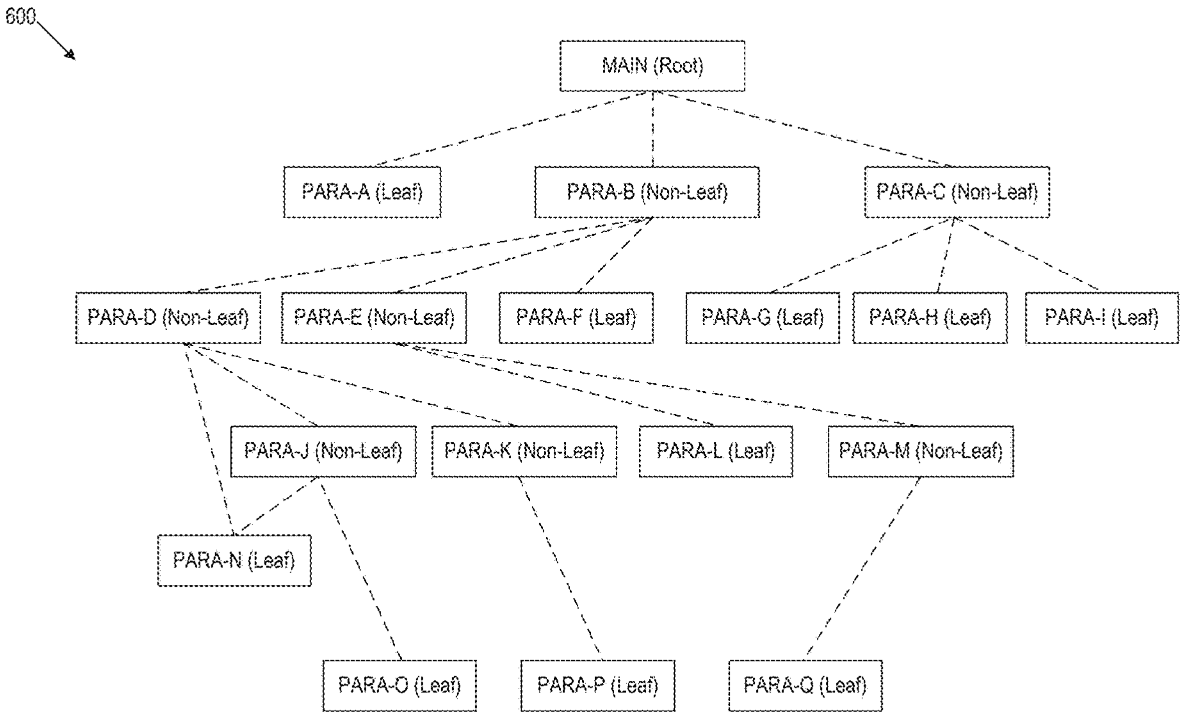
FIG. 6 is a hierarchical tree diagram showing the organization of program components, in accordance with an embodiment of the disclosure.

FIG. 6 is a hierarchical tree diagram 600 showing the organization of program components, in accordance with an embodiment of the disclosure. FIG. 6 is explained in conjunction with elements from FIG. 1, FIG. 2, FIG. 3, FIG. 4, and FIG. 5. With reference to FIG. 6, there is shown a diagram 600 that includes a root node labeled "MAIN (Root)" at the top level, with multiple branches extending downward to child nodes. The nodes are connected by dashed lines indicating parent-child relationships.

The diagram 600 depicts a hierarchical structure of program components, which may represent the organization of code chunks within the computer-executable application 210. This structure may be generated by the computer system 202 during the analysis of the source code repository 208. The computer-executable application 210 may be divided into a plurality of application components based on the file data. The plurality of application components is executable based on the dependencies between the plurality of application components. For example, a banking application may include components such as "Customer Onboarding," "Account Management," "Transaction Processing," and "Reporting," where the Transaction Processing component depends on Account Management for account validation before processing transactions.

The diagram 600 shows three main branches stemming from the root: PARA-A (Leaf), PARA-B (Non-Leaf), and PARA-C. PARA-B (Non-Leaf) further branches into PARA-D (Non-Leaf), PARA-E (Non-Leaf), and PARA-F (Leaf). Similarly, PARA-C branches into PARA-G (Leaf), PARA-H (Leaf), and PARA-I (Leaf). In a COBOL context, these nodes might represent program paragraphs, where "PARA" is short for "paragraph." For example, PARA-A might represent a "VALIDATE-CUSTOMER" paragraph, PARA-B might represent a "PROCESS-TRANSACTION" paragraph, and PARA-C might represent a "GENERATE-REPORT" paragraph. Each of these paragraphs may contain business logic, rules, and input/output specifications that can be extracted and documented by the computer system 202.

The diagram 600 continues to branch downward, with PARA-D (Non-Leaf) connecting to PARA-J (Non-Leaf), PARA-K (Non-Leaf), PARA-L (Leaf), and PARA-M (Non-Leaf). At the lowest level, leaf nodes PARA-N (Leaf), PARA-O (Leaf), PARA-P (Leaf), and PARA-Q (Leaf) are shown. In a banking application, PARA-D might represent a "VALIDATE-TRANSACTION" paragraph that calls several lower-level paragraphs: PARA-J for "CHECK-ACCOUNT-STATUS", PARA-K for "VERIFY-TRANSACTION-LIMITS", PARA-L for "VALIDATE-CUSTOMER-PIN", and PARA-M for "APPLY-BUSINESS-RULES". PARA-M might further call PARA-N for "CHECK-DAILY-LIMITS", PARA-O for "APPLY-FRAUD-DETECTION", PARA-P for "VERIFY-INTERNATIONAL-PERMISSIONS", and PARA-Q for "LOG-VALIDATION-RESULTS".

Each node in diagram 600 is labeled with either "Leaf" or "Non-Leaf" to indicate whether the node represents an endpoint or an intermediate node in the hierarchy. This distinction may be used by the computer system 202 during the traversal of nodes for analysis and documentation generation. Leaf nodes represent the most granular functional units that don't call other paragraphs or methods, such as a simple calculation routine or validation check. Non-leaf nodes represent higher-level components that orchestrate multiple lower-level functions, such as a main processing routine that calls several subroutines.

The hierarchical structure allows for the organization and relationship mapping of program components from highest to lowest levels. This organization may facilitate efficient analysis and documentation of the computer-executable application 210 by the computer system 202. The plurality of code chunks corresponds to an application component, and the natural language description that corresponds to a root node of the plurality of nodes is a component-wide description of the application component. For example, the natural language description for the root node "MAIN (Root)" might provide a comprehensive overview of the entire program's purpose, key workflows, main business rules, and complete input/output specifications.

The computer system 202 may traverse the plurality of nodes in the hierarchical database 204 using a specific order. The traversing may include: selecting the set of leaf nodes in a specific order; selecting each non-leaf node of the set of non-leaf nodes based on the selecting of the set of leaf nodes and a count of leaf nodes that depend on a respective non-leaf node of the set of non-leaf nodes; and selecting the root node based on the selecting of each non-leaf node of the set of non-leaf nodes. This traversal approach implements a mathematical selection rule where a non-leaf node N is selected for processing only when all of the non-leaf node N's child nodes have been processed, which can be expressed as: $\text{Select}(N)=\text{true}$ if and only if $\forall c \in \text{Children}(N)$: $\text{Processed}(c)=\text{true}$, where Children(N) represents the set of all child nodes of node N, and Processed(c) indicates whether child node c has been processed. For example, in the diagram 600, leaf nodes PARA-A, PARA-F, PARA-G, PARA-H, PARA-I, PARA-L, PARA-N, PARA-O, PARA-P, and PARA-Q is processed first. Then, non-leaf nodes like PARA-B, PARA-C, PARA-D, PARA-E, PARA-J, PARA-K, and PARA-M is processed once all their child nodes have been processed. This would continue upward through the hierarchy until reaching the root node "MAIN (Root)".

This traversal approach may ensure that all dependencies are properly analyzed before their dependent components, resulting in more accurate and contextually rich descriptions that incorporate information from all relevant sub-components.

Figure 7A:
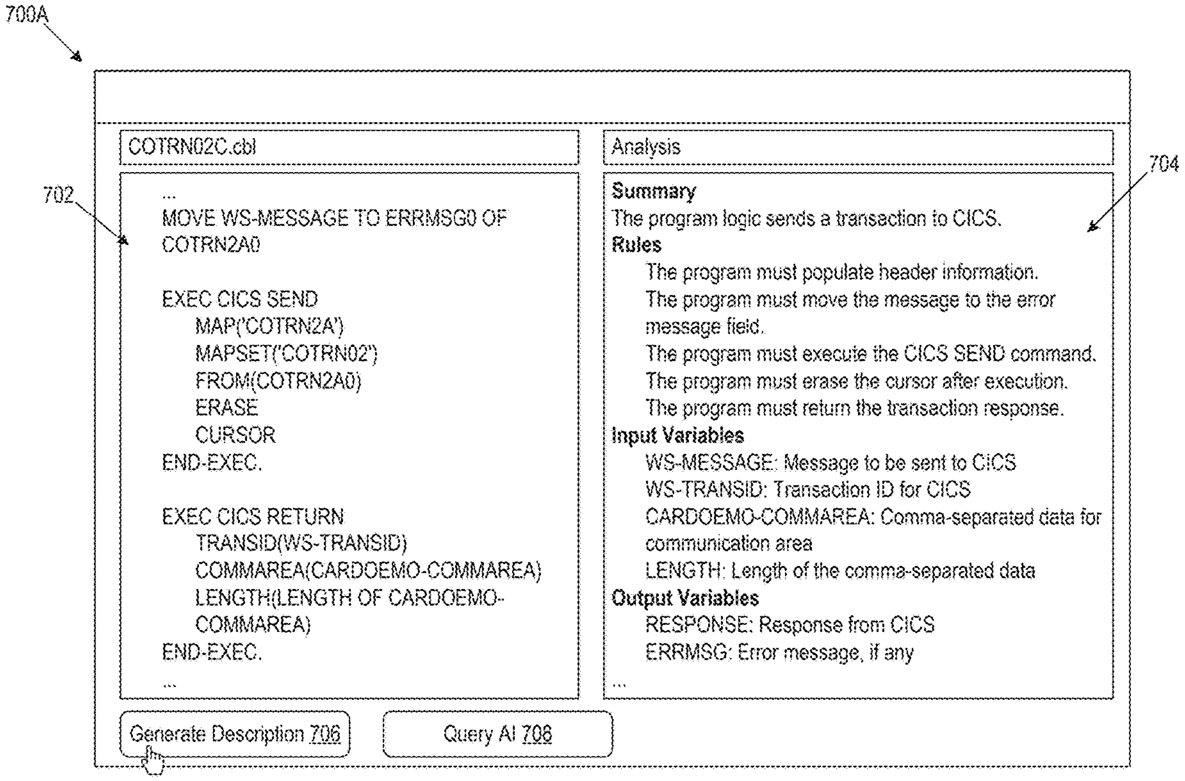
FIG. 7A is a diagram illustrating a user interface for analyzing and documenting program code, in accordance with an embodiment of the disclosure.

FIG. 7A is a diagram that illustrates a user interface for analyzing and documenting program code, in accordance with an embodiment of the disclosure. FIG. 7A is explained in conjunction with elements from FIG. 1, FIG. 2, FIG. 3, FIG. 4, FIG. 5, and FIG. 6. With reference to FIG. 7A, there is shown a user interface 700A. The user interface 700A includes a code display panel 702, an analysis panel 704, a generate description button 706, and a query AI button 708.

In some cases, the user interface 700A may be displayed on the user device 212 of FIG. 2. The user interface 700A may provide an interactive web interface for viewing and analyzing code from the source code repository 208. The code display panel 702 may show program code, such as COBOL code in this example. Adjacent to the code display panel 702 is the analysis panel 704 that may present information about the displayed code, including a summary and rules section describing the program logic, as well as input and output variables. The natural language description includes a logic associated with the respective code chunk, business rules associated with the respective code chunk, and input and output parameter specification associated with the respective code chunk. For example, the analysis panel 704 might display a description like: "Summary: The program logic sends a transaction to CICS. Rules: (1) The program must populate header information, (2) The program must move the message to the error message field, (3) The program must execute the CICS SEND command, (4) The program must erase the cursor after execution, (5) The program must return the transaction response. Input Variables: WS-MESSAGE: Message to be sent to CICS, WS-TRANSID: Transaction ID for CICS, CARDOEMO-COMMAREA: Comma-separated data for communication area, LENGTH: Length of the comma-separated data. Output Variables: RESPONSE: Response from CICS, ERRMSG: Error message, if any."

The user interface 700A may include interactive elements at the bottom, including the generate description button 706 and the query AI button 708. These buttons may allow users to interact with the interface to obtain additional information about the code being analyzed.

In some embodiments, the user interface 700A may include selection of specific programs or transactions for analysis. The user interface 700A may also include zoom functionality for detailed information on specific nodes of the hierarchical database 204. This functionality may allow users to focus on particular sections of code or specific components of the analyzed program. The computer system 202 generates a hierarchical representation that represents the plurality of application components as a plurality of component-level nodes in the hierarchical database 204. Each component-level node is associated with a component-wide description of the application component. For example, in a banking application, component-level nodes represent complete business processes that span multiple COBOL programs, such as a customer onboarding transaction flow that includes programs for data entry, validation, and account creation.

In some embodiment, the user interface 700A may include display of a hierarchical flow chart (not shown), code view, and analysis view. The hierarchical flow chart may visually represent the structure of the analyzed program, showing relationships between different code chunks or application components. The code view in the code display panel 702 may show specific program commands and statements, while the analysis view in the analysis panel 704 may provide natural language descriptions of the code's functionality, business rules, and variable specifications. As shown in FIG. 7A, the code display panel 702 displays COBOL-style code that includes a PERFORM statement with conditional logic involving variables, while the analysis panel 704 provides a structured breakdown of the code's functionality, including a summary section, rules section, and input/output variables section.

In some embodiments, the user interface 700A may include copy functionality for analysis results. This feature may allow users to easily extract and share specific portions of the generated documentation or analysis.

Figure 7B:
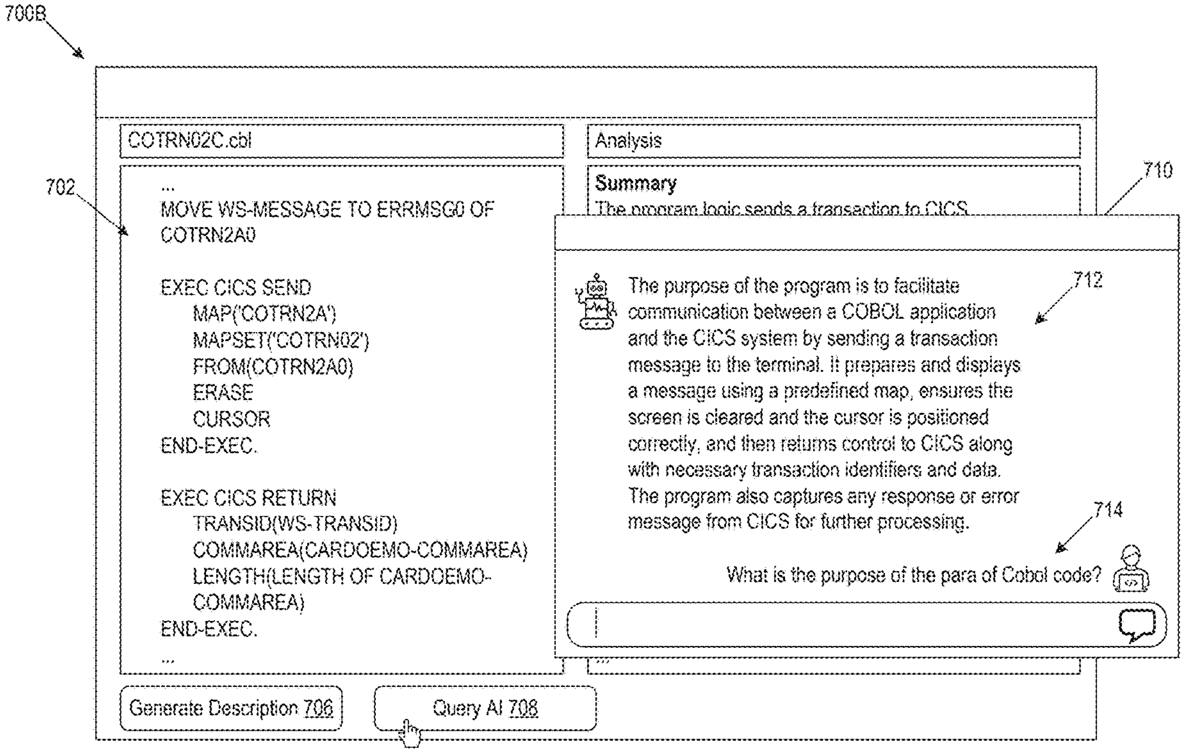
FIG. 7B is a diagram illustrating another user interface for analyzing and documenting program code, in accordance with an embodiment of the disclosure.

FIG. 7B is a diagram that illustrates another user interface for analyzing and documenting program code, in accordance with an embodiment of the disclosure. FIG. 7B is explained in conjunction with elements from FIG. 1, FIG. 2, FIG. 3, FIG. 4, FIG. 5, FIG. 6, and FIG. 7A. With reference to FIG. 7B, there is shown a user interface 700B. The user interface 700B includes the code display panel 702, the generate description button 706, the query AI button 708, a chat interface 710, a natural language response 712, and a natural language query 714.

When the user 220 enters a natural language query associated with an aspect of the computer-executable application 210 via the user interface 700B, the computer system 202 executes a vector search across the hierarchical database 204 based on the natural language query 714 and stored vector embedding data for each node of a plurality of nodes. The user interface 700B may display the chat interface 710 that presents analysis results. Within the chat interface 710, the interface may include the natural language query 714 about the displayed code, such as "What is the purpose of the para of Cobol code?"

When the user 220 selects the query AI button 708, the computer system 202 receives the natural language query 714 associated with an aspect of the computer-executable application 210 via the user interface 700B, executes the vector search across the hierarchical database 204, determines relevant node(s) that match context of the natural language query 714, extracts node content of such relevant node(s), generates the natural language response 712 to the natural language query 714, and renders the natural language response 712 on the user interface 700B. The natural language response 712 may provide a description of the program's purpose and functionality, such as: "The purpose of the program is to facilitate communication between a COBOL application and the CICS system by sending a transaction message to the terminal. It prepares and displays a message using a predefined map, ensures the screen is cleared and the cursor is positioned correctly, and then returns control to CICS along with necessary transaction identifiers and data. The program also captures any response or error message from CICS for further processing."

The code display panel 702 may show specific code segments including EXEC CICS commands and other programming statements. The natural language response 712 may explain that the program facilitates communication between a COBOL application and CICS system by sending transaction messages, preparing predefined maps, managing screen displays, and handling response processing. This demonstrates the system's ability to analyze and document legacy code where each code chunk is a computer-executable code chunk that is one of a function, a COBOL paragraph, a procedure, a method, a class, a routine, or a script.

In some embodiments, the user interface 700B may include collaborative features for review and editing of generated summaries. These features may allow multiple users to work together on analyzing and documenting complex codebases. The computer system 202 may also include functionality for marking of reviewed content to facilitate team collaboration. This may help teams track progress and ensure thorough review of all generated documentation. The user interface 700B supports global development teams through multi-language summaries, which is particularly valuable when documenting legacy applications developed in regions where non-English programming practices are common.

The user interface 700B may include documentation export functionality, including export of SVG files of flow charts. This feature may allow users to generate standalone documentation artifacts that can be shared or integrated into other systems. This supports the system's overall purpose of automating the documentation process for complex codebases, which significantly reduces the time and effort required for manual documentation while ensuring comprehensive coverage of all code components.

Figure 8:
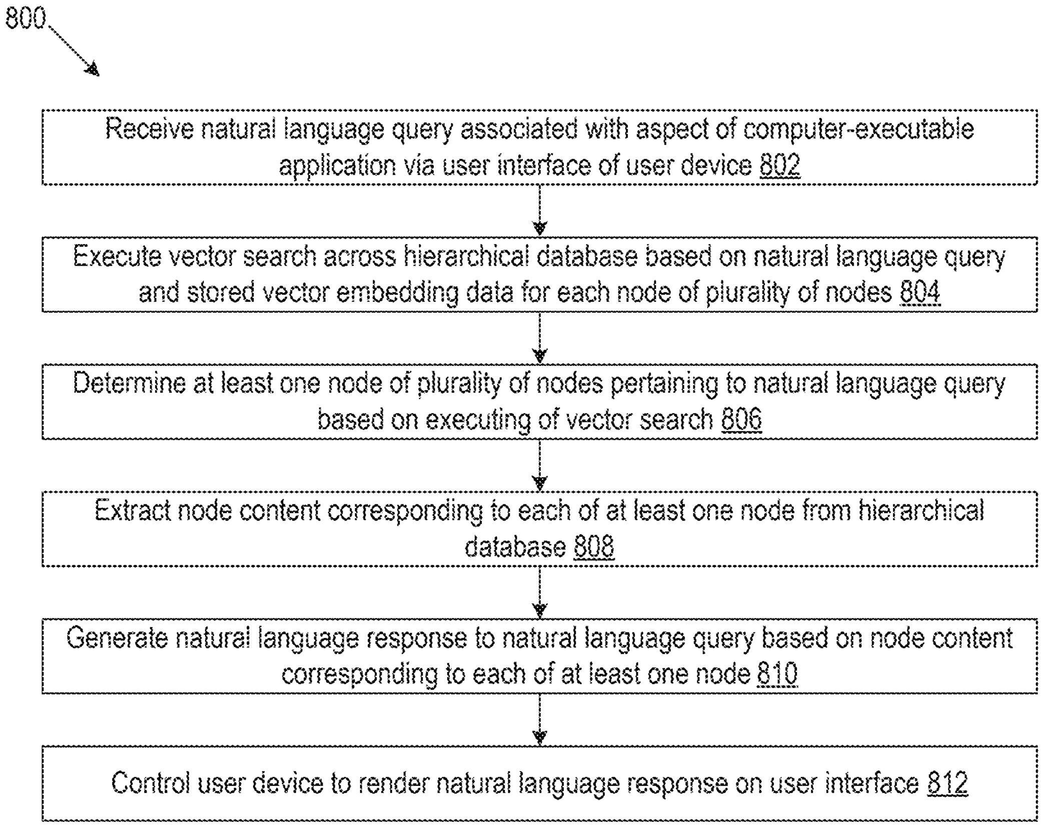
FIG. 8 is a flowchart depicting a process for responding to natural language queries about a computer-executable application, in accordance with an embodiment of the disclosure.

FIG. 8 is a diagram that illustrates a flowchart 800 depicting a process for responding to natural language queries about a computer-executable application, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown the flowchart 800. The operations of the exemplary method may be executed by the computer system 202 of FIG. 2. The operations of the flowchart 800 may start at 802. This process implements functionality that enables users to query the system about application functionality using natural language.

At 802, the operations include reception of a natural language query associated with an aspect of the computer-executable application 210 via the user interface 214 of the user device 212. In some cases, the computer system 202 may receive the natural language query from a user interacting with the user interface 214 displayed on the user device 212. For example, a user might enter a query such as "How does this program handle CICS transactions?" through the natural language query field in the chat interface 710.

At 804, the operations include execution of a vector search across the hierarchical database 204 based on the natural language query and stored vector embedding data for each node of a plurality of nodes. The computer system 202 may perform the vector search using the embedding model 218 to compare the query against the stored vector embeddings. This vector search capability is enabled by the vector embedding data previously generated and stored in the hierarchical database 204. For example, when searching for information about "interest calculation for premium accounts," the computer system 202 computes the vector representation of this natural language query and compare the vector representation against all stored vector embeddings to find semantically similar content, even if the exact terms don't appear in the code. The comparison may be based on a suitable similarity measure such as cosine similarity to compute similarity scores (e.g., a score between 0 and 1).

At 806, the operations include determination of at least one node of the plurality of nodes pertaining to the natural language query based on the executing of the vector search. The computer system 202 may identify the most relevant nodes based on similarity scores between the query embedding and the stored vector embeddings corresponding to the nodes. For example, if a user queries about "premium customer interest calculations," the computer system 202 might identify nodes representing the "CALCULATE-INTEREST" paragraph that contains logic for applying a 10% bonus to premium accounts with customer loyalty exceeding 5 years, as well as related nodes that reference this calculation.

At 808, the operations include extraction of node content corresponding to each of the at least one node from the hierarchical database 204. The computer system 202 may retrieve the natural language descriptions and associated metadata for the identified relevant nodes. For instance, continuing with the premium interest calculation example, the computer system 202 extracts the comprehensive description of the "CALCULATE-INTEREST" paragraph that includes its business logic ("calculates monthly interest based on account balance, tier-based interest rates, and customer loyalty status"), business rules (the tiered interest rates and loyalty bonus conditions), and input/output parameters (ACCOUNT-BALANCE, ACCOUNT-TYPE, CUSTOMER-LOYALTY-YEARS as inputs and MONTHLY-INTEREST-AMOUNT, INTEREST-RATE as outputs). This extraction process leverages the hierarchical database structure where each record includes node content of a respective node, and each record is linked to one or more different records of the hierarchical database 204.

At 810, the operations include generation of a natural language response to the natural language query based on node content corresponding to each of the at least one node. The computer system 202 may use the neural language model 216 to synthesize a coherent response from the extracted node content. For example, in response to the query about premium customer interest calculations, the computer system 202 might generate a response like: "Premium customers receive interest based on a tiered structure determined by their account balance: 0.5% for balances below $1,000, 1.2% for balances between $1,000-$10,000, and 1.8% for balances above $10,000. Additionally, premium account holders with more than 5 years of customer loyalty receive a 10% bonus on their calculated interest. This calculation is performed in the CALCULATE-INTEREST paragraph, which takes the account balance, account type, and customer loyalty years as inputs and produces the monthly interest amount as output."

At 812, the operations include controlling the user device 212 to render the natural language response on the user interface 214. The computer system 202 may send the generated response to the user device 212 for display within the user interface 214, such as within a chat interface or dedicated response panel. As shown in FIG. 7B, the natural language response 712 is displayed in the chat interface 710, providing the user with a detailed explanation of the queried functionality. This natural language query capability enables access to codebase knowledge, allowing non-technical stakeholders to obtain information about the computer-executable application 210 without requiring programming expertise, and enabling faster information retrieval compared to manual code inspection using vector search.

Figure 9:
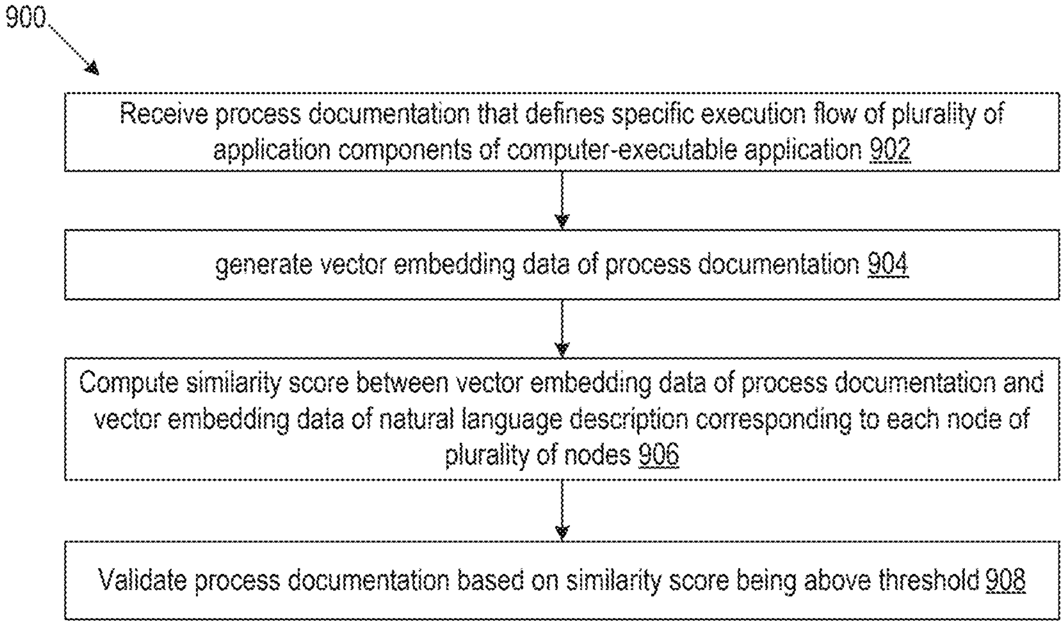
FIG. 9 is a flowchart depicting a process for validating process documentation, in accordance with an embodiment of the disclosure.

FIG. 9 is a diagram that illustrates a flowchart 900 depicting a process for validating process documentation, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown the flowchart 900. The operations of the exemplary method may be executed by the computer system 202 of FIG. 2. The operations of the flowchart 900 may start at 902. This process implements functionality that enables validation of process documentation against the actual code implementation.

At 902, the operations include reception of process documentation that defines a specific execution flow of a plurality of application components of the computer-executable application 210. In some cases, the computer system 202 may receive the process documentation from the user device 212 or from the server 206 connected to the computer system 202. For example, during a modernization project, the computer system 202 might receive documentation describing a customer onboarding process that includes steps for data entry, validation, credit assessment, account creation, and welcome package generation. This documentation can be in the form of a business process document, a modernization specification, or user story acceptance criteria.

At 904, the operations include generation of vector embedding data of the process documentation. The computer system 202 may use the embedding model 218 to create a vector representation of the received process documentation. For instance, the computer system 202 converts the textual description of the customer onboarding process into a high-dimensional vector (or a set of vectors corresponding to chunks of the textual description) that captures the semantic meaning of the process flow, including key concepts like “customer information collection,” “identity verification,” “credit assessment,” and “account creation.” The vector embedding approach enables semantic comparison between the documentation and the actual code implementation, going beyond simple keyword matching to understand conceptual similarities.

At 906, the operations include computation of a similarity score between the vector embedding data of the process documentation and vector embedding data of a natural language description corresponding to each node of a plurality of nodes. The computer system 202 may compare the process documentation embedding against the stored embeddings for each relevant node in the hierarchical database 204. For example, the computer system 202 compares the vector representation of the customer onboarding process documentation against the vector embeddings of natural language descriptions for components like the “CUST-INFO” paragraph (personal information collection), “ID-VERIFY” paragraph (identity verification), “CRED-CHECK” paragraph (credit assessment), and “ACCT-CREATE” paragraph (account creation). The computer system 202 calculates similarity scores that quantify how closely the documentation matches the actual implementation of each component.

At 908, the operations include validation of the process documentation based on the similarity score being above a threshold. The computer system 202 may determine if the computed similarity scores exceed a defined threshold, indicating a sufficient match between the process documentation and the actual code implementation as represented by node-level descriptions. For instance, if the similarity score between the customer onboarding process documentation and the relevant code chunks exceeds 0.85 (on a scale of 0 to 1), the computer system 202 validates the documentation as accurately reflecting the implementation. However, if the documentation describes a fraud detection step that has no corresponding component in the code with a similarity score above the threshold, the computer system 202 flags this discrepancy. This validation capability is particularly valuable for modernization projects, where it is essential to verify that the modernized implementation accurately reflects the business logic of the original legacy computer-executable application.

In some cases, the computer system 202 stores vector embedding data of the natural language description corresponding to each node of the plurality of nodes in the hierarchical database 204. The vector embeddings may be stored alongside the corresponding natural language descriptions and other node metadata within the hierarchical database 204. For instance, the vector representation of the “CALCULATE-INTEREST” paragraph description is stored in the same database record as the paragraph’s code, natural language description, and metadata like node ID and hash value. The stored vector embeddings enable efficient semantic search and similarity analysis without needing to recompute the embeddings for each query or comparison.

The operations illustrated in the flowcharts 800 and 900 may enable efficient retrieval of relevant information from the analyzed codebase and validation of external documentation against the actual code implementation. These capabilities may support various use cases such as assisting developers in understanding complex codebases, validating modernization efforts, and ensuring consistency between documentation and implementation. For example, during a COBOL-to-Java modernization project, the computer system 202 can validate that the Java implementation correctly implements the same business rules for premium customer interest calculation as the original COBOL program. Similarly, when onboarding new team members to maintain a legacy system, users can use natural language queries to quickly understand specific aspects of the codebase without needing to manually trace through multiple programs. These capabilities directly address the challenges, where legacy systems often lack adequate documentation, which slows down modernization efforts and poses risks to business continuity when attempting to update or replace these critical systems.

Figure 10:
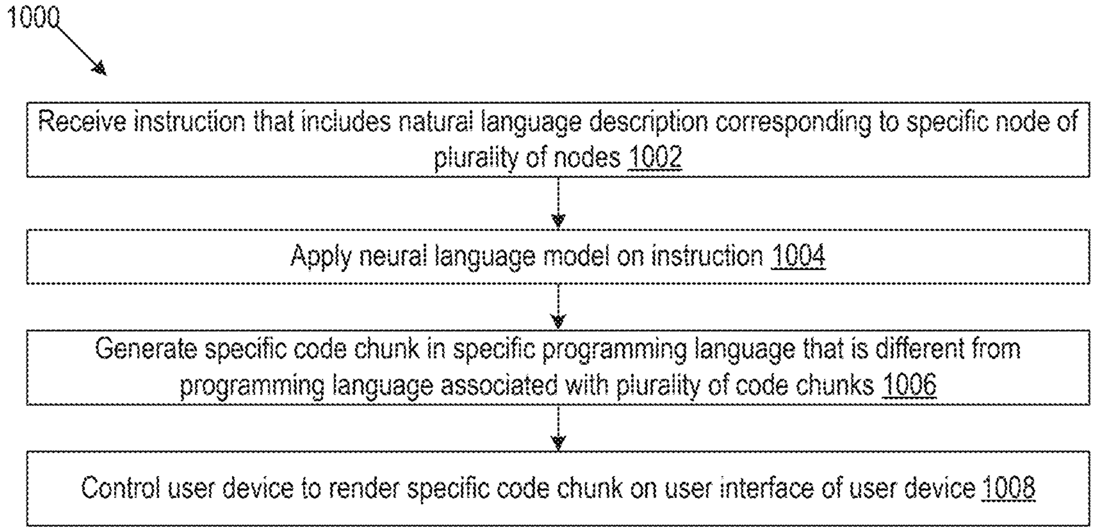
FIG. 10 is a flowchart depicting a process for generating code chunks based on natural language descriptions, in accordance with an embodiment of the disclosure.

FIG. 10 is a diagram that illustrates a flowchart 1000 depicting a process for generating code chunks based on natural language descriptions, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown the flowchart 1000. The operations of the exemplary method may be executed by the computer system 202 of FIG. 2. The operations of the flowchart 1000 may start at 1002.

At 1002, the operations include reception of an instruction that includes the natural language description corresponding to a specific node of the plurality of nodes. In some cases, the computer system 202 may receive the instruction from the user device 212 through the user interface 214. For example, a user might provide a natural language description such as “Calculate the total interest for a savings account based on the account balance and interest rate, applying a 0.25% bonus rate for accounts with balances over $10,000 and customer relationships longer than 5 years.” Another example might be “Validate customer information by checking that the customer’s age is at least 18 years, the provided address matches postal service records, and the social security number passes the Luhn algorithm check.”

At 1004, the operations include application of the neural language model to the instruction. The computer system 202 may apply the neural language model 216 to process and understand the received instruction. The neural language model 216 may analyze the semantic content of the natural language description to extract key information about the desired functionality. For example, when processing the interest calculation description, the neural language model 216 identifies key concepts, such as "interest calculation," "account balance," "interest rate," "bonus rate," "balance threshold of $10,000," and "customer relationship duration of 5 years." The neural language model 216 identifies these concepts as parameters and conditions that must be incorporated into the generated code chunk.

At 1006, the operations include generation of a specific code chunk in a specific programming language that may be different from a programming language associated with the plurality of code chunks. The computer system 202 may generate the specific code chunk based on the applying of the neural language model 216 to the instruction. For example, if the original codebase is in COBOL, the computer system 202 might generate a Java code chunk such as: "public double calculateInterest(double accountBalance, double baseRate, int relationship Years) {double interestRate=baseRate; if (accountBalance>10000 && relationship Years>5) {interestRate+=0.0025;} return accountBalance*interestRate;}". Alternatively, if translating from COBOL to Python, the computer system 202 might generate: "def calculate_interest(account_balance, base_rate, relationship_years): interest_rate=base_rate if account_balance>10000 and relationship_years>5: interest_rate+=0.0025 return account_balance*interest_rate". These generated code chunks implement the same business logic as described in the natural language instruction but expressed in different programming languages.

At 1008, the operations include controlling the user device 212 to render the specific code chunk on the user interface 214 of the user device 212. The computer system 202 may send the generated code chunk to the user device 212 for display within the user interface 214. For example, the computer system 202 might display the generated Java method in a code editor panel within the user interface 214, with syntax highlighting to enhance readability. The user interface 214 might also include options for the user to copy the code, modify the code directly in the editor, regenerate the code with different parameters, or save the code to a file. The user interface 214 can additionally show a side-by-side comparison between the original COBOL code and the newly generated Java or Python code, allowing users to verify that the business logic has been correctly translated between the different programming languages.

Figure 11:
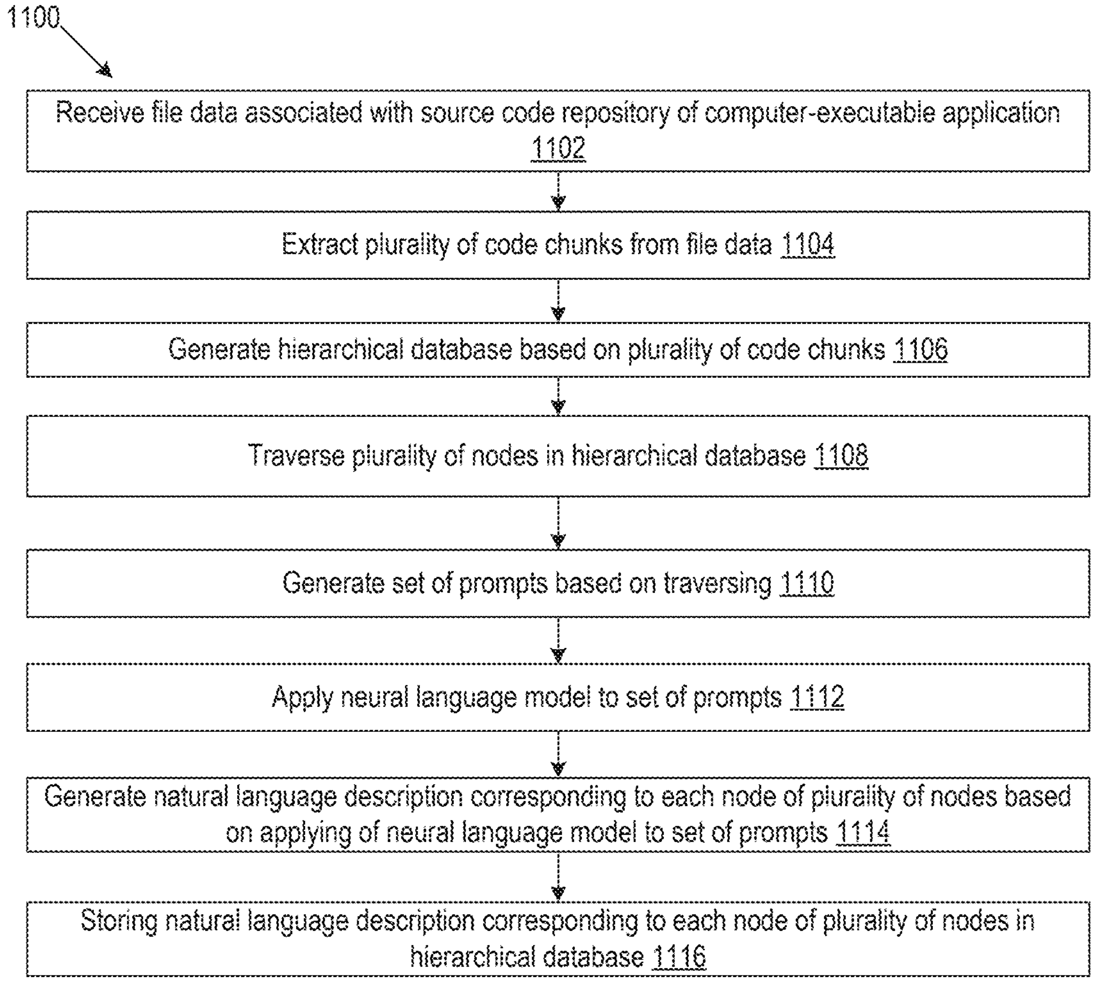
FIG. 11 is a flowchart depicting a process for generating and storing natural language descriptions of code, in accordance with an embodiment of the disclosure.

FIG. 11 is a diagram that illustrates a flowchart 1100 depicting a process for generating and storing natural language descriptions of code, in accordance with an embodiment of the disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown the flowchart 1100. The operations of the exemplary method may be executed by the computer system 202 of FIG. 2. The operations of the flowchart 1100 may start at 1102.

At 1102, the operations include reception of file data associated with a source code repository of a computer-executable application. In some cases, the computer system 202 may receive the file data from the source code repository 208 of the computer-executable application 210 stored on the server 206.

At 1104, the operations include extraction of a plurality of code chunks from the file data. The computer system 202 may analyze the received file data to identify and extract distinct code chunks, such as functions, methods, or procedures.

At 1106, the operations include generation of a hierarchical database based on the plurality of code chunks. The computer system 202 may create the hierarchical database 204 to represent the structure and relationships of the extracted code chunks.

At 1108, the operations include traversal of a plurality of nodes in the hierarchical database 204. The computer system 202 may navigate through the plurality of nodes of the hierarchical database 204, which represent the extracted code chunks.

At 1110, the operations include generation of a set of prompts based on the traversing. The computer system 202 may generate the set of prompts for each node, incorporating the code chunk and relevant contextual information.

At 1112, the operations include application of the neural language model to the set of prompts. The computer system 202 may apply the neural language model 216 to process each prompt and generate a corresponding natural language description.

At 1114, the operations include generation of natural language descriptions corresponding to each node of the plurality of nodes based on the applying of the neural language model to the set of prompts. The computer system 202 may generate detailed natural language descriptions for each code chunk represented by a node in the hierarchical database 204.

At 1116, the operations include storage of the natural language descriptions corresponding to each node of the plurality of nodes in the hierarchical database 204. The computer system 202 may store the generated descriptions alongside their corresponding code chunks in the hierarchical database 204.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable people of ordinary skill in the art to understand the embodiments disclosed herein.

What is claimed is:

1. A computer-implemented method, comprising:

receiving, by a computer, file data associated with a source code repository of a computer-executable application;

extracting, by the computer, a plurality of code chunks from the file data;

generating, by the computer, a hierarchical database based on the plurality of code chunks, the hierarchical database comprising a plurality of nodes representing the plurality of code chunks, and relationships between the plurality of nodes representing dependencies among the plurality of code chunks;

traversing, by the computer, the plurality of nodes in the hierarchical database;

generating, by the computer, a set of prompts based on the traversing, each prompt of the set of prompts comprising a respective code chunk of the plurality of code chunks;

applying, by the computer, a neural language model to the set of prompts;

generating, by the computer, a natural language description corresponding to each node of the plurality of nodes based on the applying of the neural language model to the set of prompts; and storing, by the computer, the natural language description corresponding to each node of the plurality of nodes in the hierarchical database.

2. The computer-implemented method according to claim 1, further comprising dividing, by the computer, the computer-executable application into a plurality of application components based on the file data, wherein the plurality of application components is executable based on the dependencies between the plurality of application components, and the plurality of code chunks corresponds to an application component of the plurality of application components.

3. The computer-implemented method of claim 2, wherein the natural language description comprises:

a logic associated with the respective code chunk, business rules associated with the respective code chunk, and input and output parameter specification associated with the respective code chunk.

4. The computer-implemented method of claim 2, wherein the plurality of code chunks corresponds to the application component, and the natural language description that corresponds to a root node of the plurality of nodes is a component-wide description of the application component.

5. The computer-implemented method according to claim 4, further comprising:

generating, by the computer, a hierarchical representation that represents the plurality of application components as a plurality of component-level nodes in the hierarchical database, wherein each component-level node of the plurality of component-level nodes is associated with the component-wide description of the application component, and the application component corresponds to a respective component-level node of the plurality of component-level nodes;

traversing, by the computer, the plurality of component-level nodes to generate a set of component-level prompts;

applying, by the computer, the neural language model on the set of component-level prompts based on traversing the plurality of component-level nodes; and generating, by the computer, a component-level description corresponding to each application component of the plurality of application components based on the applying of the neural language model on the set of component-level prompts.

6. The computer-implemented method according to claim 1, wherein each code chunk of the plurality of code chunks is a computer-executable code chunk that is one of a function, a COBOL paragraph, a procedure, a method, a class, a routine, or a script.

7. The computer-implemented method according to claim 1, wherein the hierarchical database is based on a tree data structure, each record of the hierarchical database includes node content of a respective node of the plurality of nodes, and each record of the hierarchical database is linked to one or more different records of the hierarchical database.

8. The computer-implemented method according to claim 1, further comprising:

generating, by the computer, metadata for each node of the plurality of nodes based on the respective code chunk of the plurality of code chunks, wherein the metadata comprises a hash of the respective code chunk of the plurality of code chunks and a node identifier (ID) for the respective code chunk; and storing, by the computer, node content for each node of the plurality of nodes in the hierarchical database, wherein the node content comprises the respective code chunk and the generated metadata for the respective code chunk.

9. The computer-implemented method according to claim 8, further comprising:

determining, by the computer, a parent node from the hierarchical database for each node of the plurality of nodes, except for a root node of the plurality of nodes, based on the dependencies; and updating, by the computer, the metadata for each node of the plurality of nodes based on a parent node ID of the determined parent node for a respective node of the plurality of nodes.

10. The computer-implemented method of claim 1, wherein the plurality of nodes comprises a set of leaf nodes, a set of non-leaf nodes, and a root node, each node of the plurality of nodes, except the set of leaf nodes, depends on a respective set of child nodes of the plurality of nodes, and the traversing comprises:

selecting, by the computer, the set of leaf nodes in a specific order;

selecting, by the computer, each non-leaf node of the set of non-leaf nodes based on the selecting of the set of leaf nodes and a count of leaf nodes that depend on a respective non-leaf node of the set of non-leaf nodes; and selecting, by the computer, the root node based on the selecting of each non-leaf node of the set of non-leaf nodes.

11. The computer-implemented method of claim 10, wherein the set of prompts comprises a first subset of prompts for the set of leaf nodes, a second subset of prompts for the set of non-leaf nodes, and a third prompt for the root node.

12. The computer-implemented method of claim 11, wherein each of the first subset of prompts comprises:

the respective code chunk associated with a respective leaf node of the set of leaf nodes, and a first base instruction to generate the natural language description corresponding to the respective leaf node.

13. The computer-implemented method of claim 11, wherein each of the second subset of prompts and the third prompt comprises:

the respective code chunk associated with a respective non-leaf node of the set of non-leaf nodes, the natural language description corresponding to each child node of the respective set of child nodes of the respective non-leaf node, and a second base instruction to generate the natural language description corresponding to the respective non-leaf node.

14. The computer-implemented method of claim 11, wherein the third prompt comprises:

the respective code chunk associated with the root node, the natural language description corresponding to each child node of the respective set of child nodes of the root node, and a third base instruction to generate the natural language description corresponding to the root node.

15. The computer-implemented method of claim 1, further comprising:

generating, by the computer, vector embedding data of the natural language description corresponding to each node of the plurality of nodes; and storing, by the computer, the vector embedding data of the natural language description corresponding to each node of the plurality of nodes in the hierarchical database.

16. The computer-implemented method of claim 15, further comprising:

receiving, by the computer, a natural language query associated with an aspect of the computer-executable application via a user interface of a user device;

executing, by the computer, a vector search across the hierarchical database based on the natural language query and the stored vector embedding data for each node of the plurality of nodes;

determining, by the computer, at least one node of the plurality of nodes pertaining to the natural language query based on the executing of the vector search;

extracting, by the computer, node content corresponding to each of the at least one node from the hierarchical database;

generating, by the computer, a natural language response to the natural language query based on node content corresponding to each of the at least one node; and controlling, by the computer, the user device to render the natural language response on the user interface.

17. The computer-implemented method of claim 15, further comprising:

receiving, by the computer, a process documentation that defines a specific execution flow of a plurality of application components of the computer-executable application;

generating, by the computer, vector embedding data of the process documentation;

computing, by the computer, a similarity score between the vector embedding data of the process documentation and the vector embedding data of the natural language description corresponding to each node of the plurality of nodes; and validating, by the computer, the process documentation based on the similarity score being above a threshold.

18. The computer-implemented method of claim 1, further comprising:

receiving, by the computer, an instruction that includes the natural language description corresponding to a specific node of the plurality of nodes;

applying, by the computer, the neural language model on the instruction;

generating, by the computer, a specific code chunk in a specific programming language that is different from a programming language associated with the plurality of code chunks, wherein the generating of the specific code chunk is based on the applying of the neural language model on the instruction; and controlling, by the computer, a user device to render the specific code chunk on a user interface of the user device.

19. A computer system, comprising:

a processor set;

one or more computer-readable storage media; and program instructions stored on the one or more computer-readable storage media, the program instructions executable by the processor set to cause the processor set to:

receive file data associated with a source code repository of a computer-executable application;

extract a plurality of code chunks from the file data;

generate a hierarchical database based on the plurality of code chunks, the hierarchical database comprising a plurality of nodes representing the plurality of code chunks, and relationships between the plurality of nodes representing dependencies among the plurality of code chunks;

traverse the plurality of nodes in the hierarchical database;

generate a set of prompts based on the traversal, each prompt of the set of prompts comprising a respective code chunk of the plurality of code chunks;

apply a neural language model to the set of prompts;

generate a natural language description corresponding to each node of the plurality of nodes based on the application of the neural language model to the set of prompts; and store the natural language description corresponding to each node of the plurality of nodes in the hierarchical database.

20. A computer-program product, comprising:

one or more computer-readable storage media; and program instructions stored on the one or more computer-readable storage media to perform operations comprising:

receiving file data associated with a source code repository of a computer-executable application;

extracting a plurality of code chunks from the file data;

generating a hierarchical database based on the plurality of code chunks, the hierarchical database comprising a plurality of nodes representing the plurality of code chunks, and relationships between the plurality of nodes representing dependencies among the plurality of code chunks;

traversing the plurality of nodes in the hierarchical database;

generating a set of prompts based on the traversing, each prompt of the set of prompts comprising a respective code chunk of the plurality of code chunks;

applying a neural language model to the set of prompts;

generating a natural language description corresponding to each node of the plurality of nodes based on the applying of the neural language model to the set of prompts; and storing the natural language description corresponding to each node of the plurality of nodes in the hierarchical database.

* * * * *